United States Patent
Jung

(10) Patent No.: US 10,296,453 B2
(45) Date of Patent: May 21, 2019

(54) MEMORY CONTROLLER, NON-VOLATILE MEMORY SYSTEM, AND METHOD OF OPERATING THE SAME

(71) Applicant: SAMSUNG ELECTRONICS CO., LTD., Suwon-si, Gyeonggi-Do (KR)

(72) Inventor: Jae-Sung Jung, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 86 days.

(21) Appl. No.: 15/236,501

(22) Filed: Aug. 15, 2016

(65) Prior Publication Data

US 2017/0083436 A1    Mar. 23, 2017

(30) Foreign Application Priority Data

Sep. 22, 2015 (KR) .......... 10-2015-0133887

(51) Int. Cl.
*G06F 12/02* (2006.01)

(52) U.S. Cl.
CPC .. *G06F 12/0246* (2013.01); *G06F 2212/7205* (2013.01)

(58) Field of Classification Search
USPC ............................................. 711/103
See application file for complete search history.

(56) References Cited

U.S. PATENT DOCUMENTS

| | | | |
|---|---|---|---|
| 4,775,932 A | 10/1988 | Oxley et al. | |
| 6,892,212 B2 | 5/2005 | Shuf et al. | |
| 7,603,530 B1 * | 10/2009 | Liikanen ............. | G06F 11/2084 711/156 |
| 7,769,974 B2 | 8/2010 | Bhansali et al. | |
| 8,028,120 B2 * | 9/2011 | Mo ..................... | G06F 12/0246 711/103 |
| 8,108,448 B2 | 1/2012 | Siegwart et al. | |
| 8,161,228 B2 | 4/2012 | Singh et al. | |
| 8,171,239 B2 * | 5/2012 | Yim ..................... | G06F 3/0613 710/52 |
| 8,185,685 B2 | 5/2012 | Selinger | |
| 8,402,242 B2 | 3/2013 | Hu et al. | |
| 8,725,957 B2 | 5/2014 | Eleftheriou et al. | |
| 8,856,475 B1 | 10/2014 | Meir et al. | |
| 2007/0033376 A1 * | 2/2007 | Sinclair ................. | G06F 3/0605 711/203 |
| 2008/0091901 A1 * | 4/2008 | Bennett ............... | G06F 12/0246 711/165 |
| 2009/0157974 A1 * | 6/2009 | Lasser ................. | G06F 12/0884 711/135 |
| 2010/0023672 A1 * | 1/2010 | Gorobets ............ | G06F 12/0246 711/103 |

(Continued)

*Primary Examiner* — Mano Padmanabhan
*Assistant Examiner* — Jean C Edouard
(74) *Attorney, Agent, or Firm* — Volentine, Whitt & Francos, PLLC

(57) ABSTRACT

Provided are a memory controller, a non-volatile memory system, and a method of operating the same. A method of operating a memory system includes selecting a plurality of source blocks to be garbage-collected, copying selected valid data from two or more source blocks among the plurality of source blocks into a destination block, storing changed mapping information in an update cache according to a result of the copying, and updating a mapping table by using the mapping information stored in the update cache.

16 Claims, 23 Drawing Sheets

(56) References Cited

U.S. PATENT DOCUMENTS

| | | | |
|---|---|---|---|
| 2010/0325351 A1 | 12/2010 | Bennett | |
| 2011/0099323 A1 | 4/2011 | Syu | |
| 2011/0264843 A1* | 10/2011 | Haines | G06F 12/0246 711/103 |
| 2012/0079167 A1* | 3/2012 | Yao | G06F 12/0246 711/103 |
| 2012/0151124 A1* | 6/2012 | Baek | G06F 12/0246 711/103 |
| 2012/0303867 A1* | 11/2012 | Hall | G11B 5/012 711/103 |
| 2012/0311237 A1* | 12/2012 | Park | G06F 12/0246 711/103 |
| 2013/0132650 A1* | 5/2013 | Choi | G06F 12/02 711/103 |
| 2013/0166825 A1* | 6/2013 | Kim | G06F 12/0246 711/103 |
| 2013/0173875 A1* | 7/2013 | Kim | G06F 12/0246 711/160 |
| 2014/0006859 A1* | 1/2014 | Ryu | G06F 11/106 714/21 |
| 2014/0043901 A1* | 2/2014 | Kwak | G11C 16/10 365/185.03 |
| 2014/0047169 A1* | 2/2014 | Seo | G06F 12/0246 711/103 |
| 2014/0089569 A1 | 3/2014 | Pignatelli | |
| 2014/0101372 A1* | 4/2014 | Jung | G06F 12/0253 711/103 |
| 2014/0115239 A1* | 4/2014 | Kong | G06F 12/0246 711/103 |
| 2014/0281145 A1* | 9/2014 | Tomlin | G06F 12/0246 711/103 |
| 2015/0026391 A1* | 1/2015 | Su | G06F 12/0246 711/103 |

\* cited by examiner

FIG. 6B

| ADD_L | ADD_P | L2P Table 1 |
|---|---|---|
| | A_BLK | A_Page |
| 0 | BLK 1 | a |
| 1 | BLK 2 | b |
| 2 | BLK 12 | c |
| 3 | BLK 1 | d |
| 4 | BLK 3 | e |
| ⋮ | ⋮ | ⋮ |

MEMORY CONTROLLER, NON-VOLATILE MEMORY SYSTEM, AND METHOD OF OPERATING THE SAME

CROSS-REFERENCE TO RELATED APPLICATION

This application claims the benefit of Korean Patent Application No. 10-2015-0133887 filed on Sep. 22, 2015, the subject matter of which is hereby incorporated by reference.

BACKGROUND

The inventive concept relates to non-volatile memory systems, and more particularly, to memory controllers, non-volatile memory systems, and related operating methods capable of performing garbage collection operations.

Memory systems, for example, flash memory systems are widely used as non-volatile memory devices in universal serial bus (USB) drives, digital cameras, mobile phones, smart phones, tablet personal computers (PCs), memory cards, and solid state drives (SSDs). In a flash memory device, a write/read unit and an erase unit may be different from each other and thus a memory operation may be managed by a flash translation layer (FTL) that may include firmware.

In a flash memory system, data may be written to an erased block (e.g., a free block) and a garbage collection operation may be performed to secure one or more free blocks. Since data is transferred or moved during a garbage collection operation, address mapping information associated with the data being moved may be frequently updated. Alternately or additionally, metadata (e.g., mapping information) associated with data moved during a garbage collection operation may be frequently updated. Frequent and/or repeated update of data and corresponding metadata may increase latency period(s) related to garbage collection, and/or shorten the effective lifetime of memory cells in the memory system.

SUMMARY

Embodiments of the inventive concept reduce the frequency of update for data and/or metadata associated with garbage collection. Certain embodiments of the inventive concept make use of a simultaneous garbage collection of valid data stored in relation to multiple source blocks. Certain embodiments of the inventive concept make select between a source block by source block sequential garbage collection approach or the multiple source block simultaneous garbage collection approach in view of the particular nature (e.g., pattern) of the valid data to be collected.

In one embodiment, the inventive concept provides a method of performing a garbage collection operation in a memory system including a memory controller, including an update cache, and a non-volatile memory device including a memory cell array including a storage region divided into blocks and a meta region storing mapping tables managing data stored in the storage region. The method includes; storing mapping information in the update cache, and determining whether to perform a sequential garbage collection operation or a simultaneous garbage collection operation. Upon determining to perform the sequential garbage collection operation, the method collects valid data from one source block among the blocks, and updates the mapping information stored in the update cache in response to the valid data collection from the one source block, else upon determining to perform the simultaneous garbage collection operation, the method simultaneously collects valid data from a plurality of source blocks from among the blocks, and updates the mapping information stored in the update cache in response to the simultaneous collection of valid data from the plurality of source blocks.

In one aspect, the determining of whether to perform a sequential garbage collection operation or simultaneous garbage collection operation for the at least one of the blocks includes determining for at least one of the blocks whether data stored in the at least one of the blocks is random data, and if the data stored in the at least one of the blocks is random data, determining to perform the simultaneous garbage collection operation, else determining to perform the sequential garbage collection operation.

In another aspect, the determining of whether to perform a sequential garbage collection operation or simultaneous garbage collection operation for the at least one of the blocks includes; determining a valid data ratio for data stored in at least one of the blocks, comparing the determined valid data ratio to a valid data ratio threshold, and upon determining that the determined valid data ratio is greater than or equal to the valid data ratio threshold, determining to perform the simultaneous garbage collection operation, else determining to perform the sequential garbage collection operation.

In another aspect, the determining of whether to perform a sequential garbage collection operation or simultaneous garbage collection operation for the at least one of the blocks includes; (a) determining for at least one of the blocks whether data stored in the at least one of the blocks is random data, and (b) determining a valid data ratio for data stored in at least one of the blocks and comparing the determined valid data ratio to a valid data ratio threshold, such that the determining of whether to perform the simultaneous garbage collection operation or the sequential garbage collection operation is made in response to at least one of (a) and (b).

In another aspect, the method additionally includes; after updating the mapping information stored in the update cache in response to the collecting of valid data from the one source block, updating at least one of the mapping tables stored in the meta region of the memory cell array using the updated mapping information stored in the update cache.

In another aspect, the method additionally includes; after updating the mapping information stored in the update cache in response to the collecting of valid data from the plurality of source blocks, updating at least one of the mapping tables stored in the meta region of the memory cell array using the updated mapping information stored in the update cache.

In another aspect, the method additionally includes; upon determining to perform the simultaneous garbage collection operation, selecting at least two of the blocks as selected source blocks and selecting at least one of the blocks as a destination block, wherein the simultaneous collecting of valid data from the plurality of source blocks comprises simultaneously copying valid data from the source blocks to the destination block.

In another aspect, the mapping tables stored in the meta region of the memory cell array include a first mapping table and a second mapping table, the selected source blocks include a first source block and a second source block. The simultaneous copying of valid data from the selected source blocks includes; identifying first valid data stored in the first source block and associated with the first mapping table, identifying second valid data stored in the second source block and associated with the first mapping table, and simultaneously copying the first valid data from the first source block and second valid data from the second source block.

In another aspect, the method additionally includes; updating the mapping information stored in the update cache associated with the first mapping table in response to the simultaneously copying of the first valid data from the first source block and the second valid data from the second source block, and updating the first mapping table in the meta region of the memory cell array using the updated mapping information stored in the update cache.

In another embodiment, the inventive concept provides a memory controller controlling the operation of a memory device including a memory cell array including a meta region storing mapping tables and a storage region divided into blocks. The memory controller includes; a source block property determining unit that references mapping information to determine a property of valid data stored in the blocks and generate a determination result, a source selecting block unit, responsive to the determination result, that identifies at least two selected source blocks suitable for use during a simultaneous garbage collection operation and generates a selection result, a garbage collection performing unit, responsive to the selection result, that controls execution of the simultaneous garbage collection operation by garbage collecting simultaneously from the selected source blocks, and an update cache that stores initial mapping information received from the memory device and updates the initial mapping information in response to the execution of the simultaneous garbage collection operation to generate and store updated mapping information.

In another embodiment, the inventive concept includes a method of operating a memory system. The method includes; selecting source blocks for garbage collection, copying valid data from the source blocks to a destination block, storing changed mapping information in an update cache in response to the copying of the valid data from the source blocks to the destination block, and updating a mapping table with the changed mapping information stored in the update cache.

BRIEF DESCRIPTION OF THE DRAWINGS

Embodiments of the inventive concept will be more clearly understood from the following detailed description taken in conjunction with the accompanying drawings in which:

FIGS. 6A and 6B are respective conceptual diagrams illustrating an example of mapping information stored in a mapping table;

DETAILED DESCRIPTION

Figure 1:
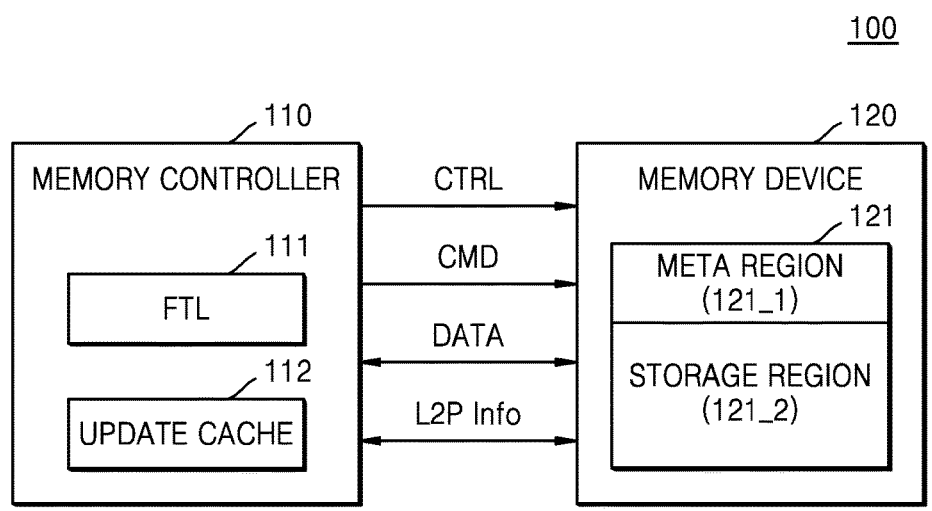
FIG. 1 is a general block diagram illustrating a memory system according to an embodiment of the inventive concept.

As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the inventive concept will be described with reference to the accompanying drawings. The embodiments are provided so that this disclosure will be thorough and complete and will fully convey the inventive concept to those of ordinary skill in the art. The inventive concept may include various embodiments and modifications, and embodiments thereof are illustrated in the drawings and will be described herein in detail. However, it will be understood that the inventive concept is not limited to the embodiments and includes all modifications, equivalents, and substitutions falling within the scope of the inventive concept. In the specification and drawings, like reference numbers and labels are used to denote like or similar elements. In the accompanying drawings, dimensions of structures may be exaggerated for clarity and convenience of description.

The terms used herein are for the purpose of describing embodiments only and are not intended to limit the inventive concept. As used herein, the singular forms "a", "an", and the are intended to include the plural forms as well, unless the context clearly indicates otherwise. It will be understood that terms such as "comprise", "include", and "have," when used herein, specify the presence of stated features, integers, steps, operations, elements, components, or combinations thereof, but do not preclude the presence or addition of one or more other features, integers, steps, operations, elements, components, or combinations thereof.

Although terms such as "first" and "second" may be used herein to describe various elements or components, the elements or components should not be limited by the terms. These terms may be used to distinguish one element or component from another element or component. For example, a first element or component may also be referred to as a second element or component, and vice versa.

Unless otherwise defined, all terms (including technical and scientific terms) used herein may have the same meaning as commonly understood by those of ordinary skill in the art to which the inventive concept belongs. It will also be understood that terms such as those defined in commonly-used dictionaries should be interpreted as having a meaning that is consistent with their meaning in the context of the relevant art and will not be interpreted in an idealized or overly formal sense unless expressly so defined herein.

Figure (FIG. 1 is a block diagram illustrating a memory system according to an embodiment. Referring to FIG. 1, a memory system 100 generally includes a memory controller 110 and a memory device 120. The memory device 120 may be a non-volatile memory device, such as a flash memory device (e.g., NAND type or NOR type), or a memory device including resistive memory cells (e.g., ReRAM, MRAM, or PRAM). Whatever type of memory cell is used in memory device 120, the vast plurality of constituent memory cells may be arranged in a memory cell array 121, generally includes a meta region 121_1 and a storage region 121_2.

The memory controller 110 may be used to control the memory device 120 during execution of various memory system operation(s), such as read, write (or program), read/write and erase operations, as well as certain housekeeping or memory system management operations. One or more memory system operations is usually executed in response to one or more requests from a host (hereafter, singularly or collectively, "a data access request"), where various data access requests are associated with one or more commands (CMD), control signal indication(s) (CTRL), data transfers (DATA), etc.

In the illustrated example of FIG. 1, the memory controller 110 is assumed to include a flash translation layer (FTL) 111 and an update cache 112. The FTL 111 may be implemented using system software (or firmware) that manages the execution of certain memory system operations by the memory device 120. One or components of the FTL 111 may be loaded into a working memory (not illustrated) of the memory controller 110. The firmware included in the FTL 111 may be driven by a processing unit (not illustrated) provided in the memory controller 110. The update cache 112 may include any type of memory capable of storing data. However, in many embodiments of the inventive concept, the update cache 112 will be implemented using volatile memory such as DRAM or SRAM that offer relatively fast data access operations.

Upon receiving a data access request including at least one logical address from the host, the FTL 111 converts the logical address into a corresponding physical address and provides the physical address to the memory device 120. The FTL 111 may also be used during certain memory system management operations, where such management operations are performed according to a defined cell region basis (e.g., a chip unit basis, block unit basis, or page unit basis) with respect to the memory cell array 121. Many different types of management operations are understood by those skilled in the art, including the so-called garbage collection operation, bad block management operation, etc.

Mapping information correlating physical address(es) with corresponding logical address(es) will often be changed as the result of a management operation. The resulting changed mapping information will ultimately be updated in the meta region 121_1 of the memory cell array 121. That is, changed mapping information may be periodically or aperiodically provided to the memory device 120 by the memory controller 110. In this regard, the update cache 112 may be used to temporarily store the changed mapping information.

Within the memory cell array 121, the meta region 121_1 may be used to store one or more types of non-normal (or "metadata") data, such as overhead data, memory system management data, reference data, etc., whereas the storage region 121_2 may be used to store normal data, such as a user-defined data, user-indicated data, payload data, etc. Of course, the exact boundaries between normal data and metadata will vary between memory system designs and applications, but those skilled in the art will generally understand these conventional distinctions. For example, the meta region 121_1 is typically used to store metadata (associated with various information types) that is useful in the definition, arrangement, allocation/de-allocation, characterization, and management of the normal data stored in the storage region 121_2. As one specific example of metadata that may be used in this manner, certain logical-to-physical mapping information (or "L2P Info") may be non-volatilely stored in the meta region 121_1. Here, L2P Info is data that identifies or allows correlation between logical address(es) and corresponding physical address(es). Hereafter, L2P Info will be used as an example of more general "mapping information" that may be generated and/or used by the FTL 111 and the memory device 120 to enable the communication of normal data between the memory controller 110 and the memory device 120.

In this regard, arbitrarily selecting a currently requested read operation or write operation as a reference point in time, an initial (or first) version of metadata, including mapping information L2P Info, is stored in the meta region 121_1. The first mapping information L2P Info stored in the meta region 121_1 is at some point provided to the memory controller 110. Upon receipt by the memory controller 110, the first mapping information may be stored in the update cache 112 or a memory associated with the update cache 112. In this manner, the memory controller 110 may manage the execution of data access operations for the memory device 120 by referencing the mapping information L2P Info stored in the update cache 112. And with each data access operation executed, the memory controller 110 may change, as necessary, the mapping information L2P Info stored in the update cache 112 or associated memory. At some point in time following the transfer of the first mapping information from the memory device 120 to the memory controller 110, and also following at least one change in the stored first mapping information by the memory controller 110 as the result of data access operation(s), a changed (or second, or updated) version of the mapping information will be transferred to and non-volatilely stored by the memory device 120 (e.g., in the meta region 121_1). In certain embodiments of the inventive concept, this storing of "updated mapping information" may result from the execution of a garbage collection operation, or some other management operation.

For example, the meta region 121_1 may include a number of mapping tables, variously used to store mapping information. Recognizing that the memory cell array 121 may be divided into a plurality of regions each having a certain size, and the meta region 121_1 may include mapping tables corresponding to the plurality of regions. Thus, assuming that the storage region 121_2 of the memory cell array 121 is implemented using a plurality of regions having a size of X, where 'X' is a natural number expressed in GB, a corresponding mapping table may be maintained for each X-sized region. That is, each mapping table may be used to store mapping information associated with a corresponding X-sized unit. So, the meta region 121_1 might include many hundreds or thousands of mapping tables in certain embodiments that are collectively used to manage the logical-to-physical address conversions for an X-sized region of the storage region 121_2. Here, the value of 'X' may be determined by a block size, a grouping of blocks, a grouping of pages, etc.

Those skilled in the art will recognize that a garbage collection operation may be executed in terms of one or more source unit(s) and destination unit(s). (Hereafter, it is assumed that a source/destination unit is a block, but this need not always be the case). Thus, assuming a requested garbage collection operation designates a source block and a destination block, at least one mapping table stored in the meta region 121_1 will be updated as the result of the garbage collection operation. That is, data designated as "valid data" in a source block will be moved to (i.e., copied to) a destination block during the garbage collection operation, and corresponding mapping information related to the valid data will be updated or changed. The resulting updated mapping information will be written to one or more mapping tables stored in the meta region 121_1 after being temporarily stored in the update cache 112, for example. Assuming in a specific example that the update cache 112 has a relatively small size (e.g., 4 KB)—because it has a relatively low degree of constituent memory cell integration—the update of mapping table(s) in the meta region 121_1 during a garbage collection operation using the update cache 112 may be an iterative process requiring multiple data copy/write operations and associated memory cell erase operations.

However, as the number of data copy/write operations (or iterative copy/write steps within a constituent garbage collection operation) required to update mapping table(s) increases, the latency period for the garbage collection operation tends to increase, and the number (or count) of erase operations applied to memory cells used to store metadata in the meta region 121_1 also increases. This increasing number of applied erase operations leads to accelerated non-volatile memory cell fatigue, and may reduce the practical operating lifetime of the memory device 120.

Recognizing these potentially adverse effects, embodiments of the inventive concept seek to reduce the update frequency for mapping tables that result from the execution of garbage collection operations, to reduce the latency period required for execution of a garbage collection operation, and to extend the practical lifetime of non-volatile memory devices provided in memory systems consistent with embodiments of the inventive concept.

As an example of reducing the update frequency of the mapping tables of the meta region 121_1, the information stored in the update cache 112 may be managed in such a manner to provide a high locality with respect to the mapping tables. As an embodiment thereof, during a garbage collection operation, two or more source blocks may be selected together and a garbage collection operation may be performed simultaneously on the selected source blocks.

For example, assuming mapping information is stored in the update cache 112, as more mapping information to be updated in the same mapping table stored in the update cache 112, the mapping information stored in the update cache 112 may be updated in the smaller number of mapping tables. That is, when the mapping information of the update cache 112 has a high locality with respect to the mapping table, an update operation may be performed on a relatively small number of mapping tables during a mapping information update process. In contrast, when the mapping information of the update cache 112 has a low locality with respect to the mapping table, an update operation may be performed on a relatively large number of mapping tables in an update process. That is, as the locality with respect to the mapping table increases, since the number of mapping tables to be updated decreases, the latency period required to perform the mapping information update process may be reduced.

Also, during a garbage collection operation, an update operation based on the update cache 112 may be repeatedly performed. That is, since the number of copy/write steps for valid data transferred during a garbage collection operation may be relatively large, but size (i.e., the data storing capacity) of the update cache 112 is relatively small, the associated mapping tables must be updated repeatedly during execution of the garbage collection operation. Thus, when the locality with respect to the mapping table increases, since an update operation for any given mapping table may be avoided (or reduced in frequency), the update frequency of each mapping table may be reduced. Also, since the memory cells located at the same position of the meta region 121_1 may be prevented from being frequently erased, the lifetime of the memory device 120 may be prevented from being shortened.

According to certain embodiments of the inventive concept, in order to increase the locality with respect to the mapping tables, a garbage collection operation may be performed simultaneously for a plurality of source blocks. That is, instead of performing a garbage collection operation block-sequentially (i.e., on a source block by source block basis), the garbage collection operation may be simultaneously performed for a plurality of source blocks. This approach allows a larger pool for selecting valid data potentially related to the same mapping table(s).

For example, when a garbage collection operation is performed sequentially according to source block units, mapping information corresponding to 600 different mapping tables may be stored in the update cache 112 having a size of 4 KB (or capable of storing 1000 mapping information elements). On the other hand, according to certain embodiments of the inventive concept, when three (3) source blocks are garbage-collected simultaneously, mapping information corresponding to only 200 different mapping tables may be stored in the update cache 112. Accordingly, the update frequency for related mapping tables in the meta region 121_1 may be reduced to ⅓ of that required by analogous conventional approaches.

The foregoing approach to the execution of a garbage collection operation wherein two or more source blocks are simultaneously "garbage-collected" may be facilitated by use of a source block determination operation. For example, when data are written to the memory device 120 according to a sequential pattern, instead of a random pattern, the data may be physically written or invalidated in the memory cell array 121 according to sequential positions. Under such conditions, even when a garbage collection operation is performed in a block-sequential manner, the mapping information stored in the update cache 112 will nonetheless have a high locality with respect to the mapping tables. Thus, recognizing this result, certain embodiments of the inventive concept will make a determination of the data type (e.g., random data verses patterned data) for data written to one or more blocks included in the memory cell array 121, where the data is determined to have a random pattern, a garbage collection operation directed to the blocks will be performed simultaneously over a plurality of source blocks. In this manner, the amount of metadata that must be updated during the garbage collection operation may be reduced. For example, assuming that each mapping table has a size of 16 KB, the mapping table may be updated in units of 16 KB. However, since the update frequency for mapping table(s) may be reduced in the update processes that may be performed in a plurality of times, the total amount of metadata updated during the garbage collection operation may be reduced.

With reference to FIG. 1, the memory controller 110 and memory device 120 may be integrated into a single semiconductor device. As an example, the memory controller 110 and memory device 120 may be integrated into a single semiconductor device to constitute a memory card, such as a PC card (PCMCIA), a compact flash card (CF), a smart media card (SM/SMC), a memory stick, a multimedia card (MMC, RS-MMC, or MMCmicro), a SD card (SD, miniSD, or microSD), or a universal flash storage (UFS). As another example, the memory controller 110 and memory device 120 may be integrated into a single semiconductor device to constitute a solid state disk/drive (SSD).

In the context of the foregoing examples, the term "garbage collection operation" encompasses a range of operations that copy valid data from at least one source block to at least one destination block in order to generate one or more free blocks. The term "simultaneous garbage collection operation" is used hereafter to denote a garbage collection operation wherein valid data is copied from at least two source block to at least one destination block in order to generate one or more free blocks. In this regard, a simultaneous garbage collection operation may include the steps of (1) selecting two or more source blocks (2) copying valid data from the selected source blocks to at least one destination block; (3) storing updated mapping information in an update cache associated with a memory controller according to the execution of the copying step; (4) updating of mapping information stored in one or more mapping tables in view of the updated mapping information stored in the update cache; and (5) erasing the selected source blocks from which valid data was copied.

Execution of a block-sequential garbage collection operation in units of one source block may secure a free block by copying valid data from one source block and then copying valid data from another source block. In contrast, executing a simultaneous garbage collection operation directed to two or more selected source blocks according to an embodiment of the inventive concept may secure a free block by copying valid data from a plurality of source blocks, regardless of the order of the selected source blocks. In this case, the valid data of two or more different source blocks may be said to be "copied together" into one or more destination block(s).

Figure 2:
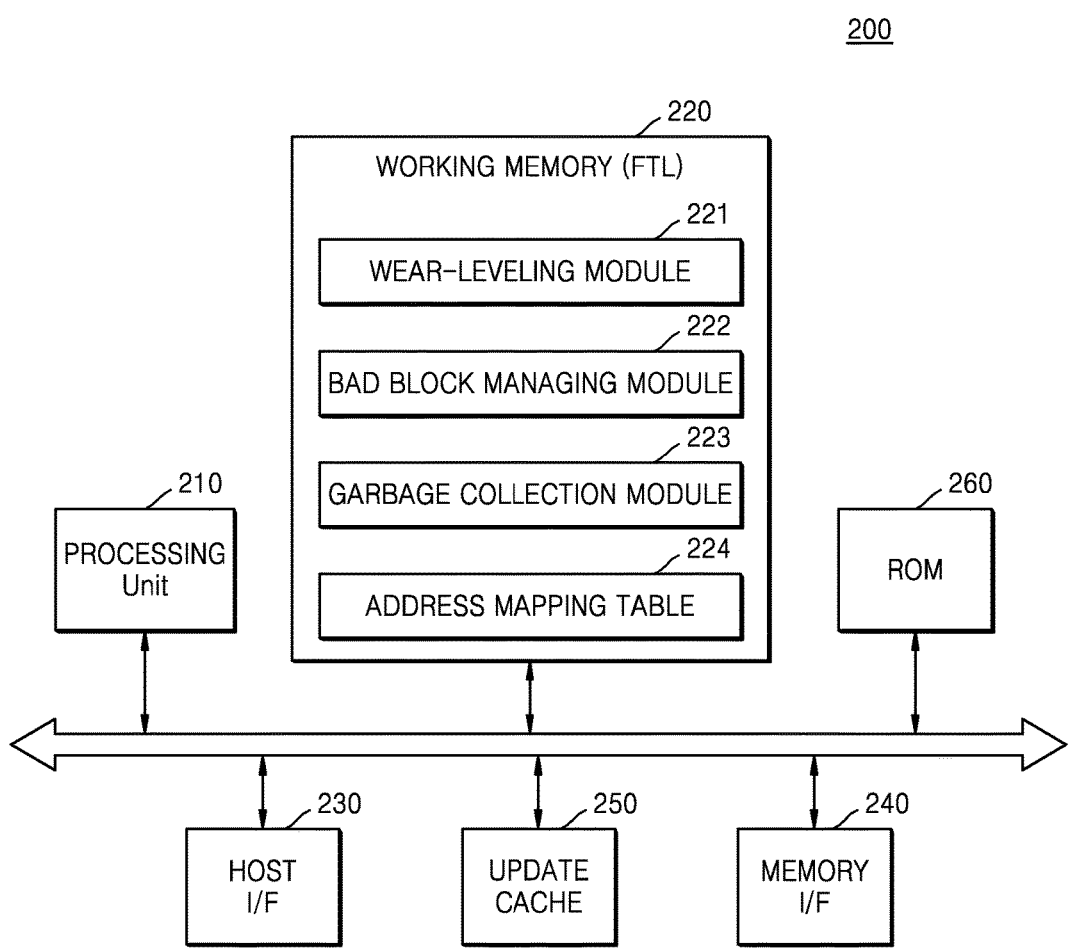
FIG. 2 is a block diagram further illustrating in one embodiment the memory controller of FIG. 1.

FIG. 2 is a block diagram further illustrating in one embodiment 200 the memory controller 110 of FIG. 1. Referring to FIG. 2, the memory controller 200 includes a processing unit 210, a working memory 220, a host interface 230, a memory interface 240, an update cache 250, and a read-only memory (ROM) 260. A FTL may be loaded to the working memory 220, and may include firmware. The FTL may variously include one or more of a wear-leveling module 221, a bad block managing module 222, a garbage collection module 223, and an address mapping table 224 according to the functions implemented by the firmware.

Although not illustrated in FIG. 2, the memory controller 200 may further include other conventionally understood components, such as a buffer memory for temporarily storing data during execution of read/write operations, a buffer control module for controlling use of the buffer memory, and a command generating module used to generate command(s) (CMD) controlling the execution of various data access operation in response to request(s) from a host.

The processing unit 210 may include, for example, a central processing unit (CPU) or a microprocessor and may control an overall operation of the memory controller 200. In order to control the memory controller 200, the processing unit 210 may drive the firmware loaded into the working memory 220. The memory controller 200 may communicate with an external host through various standard interfaces, and the host interface 230 may provide an interface between the host and the memory controller 200. The standard interfaces may include various interface schemes such as ATA (advanced technology attachment), SATA (serial ATA), e-SATA (external SATA), SCSI (small computer small interface), SAS (serial attached SCSI), PCI (peripheral component interconnection), PCI-E (PCI express), IEEE 1394, USB (universal serial bus), SD (secure digital) card, MMC (multimedia card), eMMC (embedded multimedia card), universal flash storage (UFS), and CF (compact flash) card.

The memory interface 240 may provide an interface for a memory device. For example, write data and read data may be communicated with the memory device through the memory interface 240. Also, the memory interface 240 may provide a command (CMD) and an address (ADD) to the memory device and may also receive various information from the memory device and provide the same into the memory controller 200.

The working memory 220 may include various memories and may include, for example, at least one of a cache memory, a DRAM, a SRAM, a PRAM, and a flash memory. The wear-leveling module 221 may be used to manage the wear-level of memory cells in the memory device. The memory cells are "aged" by execution of write and erase operations, and ultimately highly aged or "worn" memory cells may cause data error to arise in store data, or a defect in memory system operation. By managing the number of program/erase cycles applied to each memory cell in the memory cell array 121, the wear-leveling module 221 may prevent the memory cells in a particular memory cell array region from becoming worn more quickly than the memory cells of other regions. As an example, the wear-leveling module 221 may manage the address mapping table 224 such that program/erase counts (i.e., the number of times various erase and write operations are directed to the same memory cells) are evenly distributed over defined regions of the memory cell array (e.g., a block unit or a page unit).

The bad block managing module 222 may be used to manage the identification and non-use or avoidance of blocks deemed to be defective ("bad block") among the plurality of blocks provided by the memory device 120. For example, the bad block managing module 222 may manage the address mapping table 224 such that data is not written to a bad block.

The garbage collection module 223 may be used to manage the execution of garbage collection operations of various type including simultaneous garbage collection operations according to embodiments of the inventive concept. As noted above, a garbage collection operation is executed in order to generate one or more additional free blocks by copying valid data from at least one source block to at least one destination block and thereafter erasing the at least one source block to create or re-allocate one or more free block(s).

The address mapping table 224 may be used to manage the storing of mapping information (e.g., information correlating logical address(es) provided from the host with corresponding physical address(es) representing a physical position at which data are actually accessed). By reference to the mapping information, the logical address provided from the host may be converted into the corresponding physical address. The address mapping table 224 may include mapping information received from the meta region of a memory device, as well as updated (partially or wholly) versions of mapping information received from the meta region of the memory device. Thus, mapping information may be transferred back and forth between an update cache associated with the memory controller and the meta region of the memory device according to the address mapping table 224.

The ROM 260 may be used to store code and/or data necessary for the initial booting of the memory controller 200 and/or memory device 120 of the memory system 100. When the mapping information of the address mapping table 224 is updated, the update cache 250 may be used to temporarily store the resulting updated mapping information such that the updated mapping information may thereafter be provided to the memory device. Since the update cache 250 has a relatively small size, it may store only some of the mapping information of the address mapping table 224. Although FIG. 2 shows the update cache 250 being separately provided in the memory controller 200, other arrangements or combinations of the update cache 250 and address mapping table 224 may be provided in different embodiments of the inventive concept. For example, the update cache 250 including a volatile memory such as a DRAM or a SRAM may be provided in the processing unit 210 or may be provided in the working memory 220.

Figure 3:
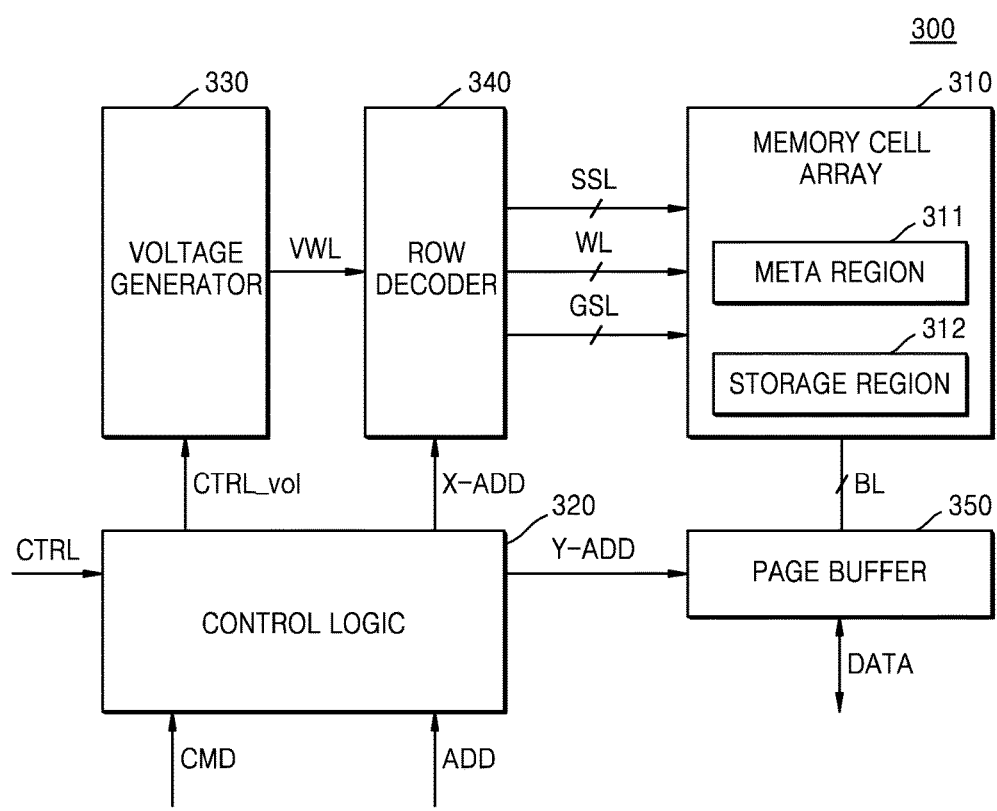
FIG. 3 is a block diagram further illustrating in one embodiment the memory device of FIG. 1.

FIG. 3 is a block diagram further illustrating in one embodiment 300 the memory device 120 of FIG. 1.

Referring to FIG. 3, the memory device 300 includes a memory cell array 310, a control logic 320, a voltage generator 330, a row decoder 340, and a page buffer 350. Although not illustrated in FIG. 3, the memory device 300 may further include a data input/output circuit or an input/output interface.

The memory cell array 310 includes a meta region 311 for storing metadata and a storage region 312 for storing normal data. Each of the meta region 311 and storage region 312 may include a plurality of memory cells. Assuming for certain embodiments that the memory cell array 310 includes flash memory cells, the memory cell array 310 may be connected to word lines WL, a string selection line SSL, a ground selection line GSL, and bit lines BL. For example, the memory cell array 310 may be connected to the row decoder 340 through the word lines WL, the string selection line SSL, and the ground selection line GSL, and may be connected to the page buffer 350 through the bit lines BL.

Based on a command CMD, an address ADD, and a control signal CTRL received from a memory controller, the control logic 320 may output various internal control signals for writing data into the memory cell array 310, reading data from the memory cell array 310, and erasing the data stored in the memory cell array 310.

The various control signals output from the control logic 320 may be provided to the voltage generator 330, the row decoder 340, and the page buffer 350. For example, the control logic 320 may provide a voltage control signal CTRL_vol to the voltage generator 330, provide a row address X-ADD to the row decoder 340, and provide a column address Y-ADD to the page buffer 350. However, the inventive concept is not limited thereto, and the control logic 320 may further provide other control signals to the voltage generator 330, the row decoder 340, and the page buffer 350.

According to an embodiment, the meta region 311 may include a plurality of mapping tables. Under the control of the memory controller, during a garbage collection operation, the memory device 300 will copy valid data from at least one source block of the storage region 312 to at least one destination block. Also, under the control of the memory controller, the mapping tables stored in the meta region 311 will be updated according to the result of executing the garbage collection process. An update operation directed to the meta region 311 may repeatedly be performed during execution of the garbage collection operation, and one or more mapping tables may be updated during each iteration of the update operation. However, as described previously the number of required mapping table updates may be markedly reduced by embodiments of the inventive concept.

Figure 4:
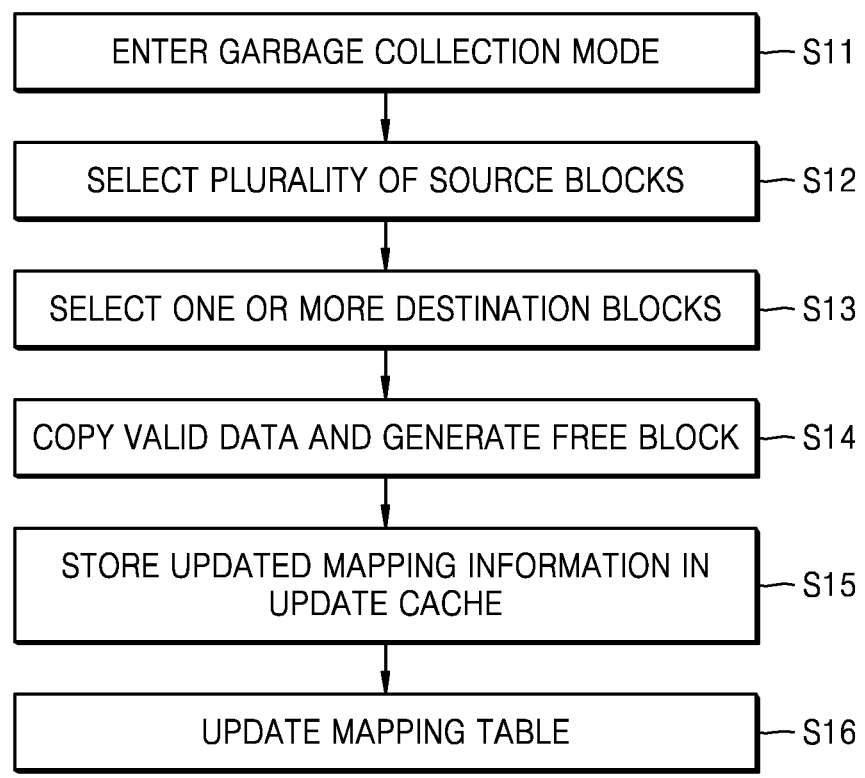
FIG. 4 is a flowchart summarizing one exemplary operation of the memory controller according to an embodiment of the inventive concept.

FIG. 4 is a flowchart illustrating an operation of a memory controller according to an embodiment.

With reference to FIGS. 1, 2, 3 and FIG. 4, the memory controller 110(200) determines a requirement to execute a garbage collection operation. This requirement may be triggered, for example, by indication that a number of free blocks has fallen below a minimum threshold, or by the passing of a predetermined period. However indicated, the determination of a requirement to execute a garbage collection operation will result in the generation of at least one additional free block, and the memory system 100 enters a corresponding garbage collection mode (S11). In certain embodiments, ongoing memory system data access operations (e.g., read/write operation(s)) may be interrupted upon entering the garbage collection mode, where the memory controller may provide a corresponding interrupt to the host.

Upon entering the garbage collection mode, the memory controller selects a plurality of source blocks (S12) and at least one destination block (S13). More source blocks than destination blocks may be selected to secure one or more free blocks. For example, three source blocks and two destination blocks may be selected, and valid data stored in the three source blocks may be copied into two destination blocks. Once all of the valid data from the three selected source blocks is copied to the destination block(s), the three selected source blocks may be erased, thereby re-allocating the three selected source blocks into three free blocks.

Once valid data has been copied into at least one destination block and at least one free block is generated (S14), corresponding mapping information is updated (or changed) accordingly. For example, the resulting updated (or changed) mapping information may be temporarily stored in the update cache (S15). Thereafter, the memory controller may update mapping tables in the memory device using the mapping information stored in the update cache (S16).

According to the above embodiment, a plurality of source blocks are selected during a garbage collection operation, and garbage collection is performed simultaneously on the selected source blocks. Thus, the pool of valid data potentially corresponding to the same mapping table(s) may be increased, and the mapping information stored in the update cache is likely to have a relatively high locality with respect to a plurality of mapping tables of the memory device. Accordingly, since the number of mapping tables actually updated as the result of a garbage collection operation may be reduced, the corresponding amount of metadata that needs to be updated may also be reduced, and the frequency with which update of the same mapping table must be performed may be reduced.

Figure 5:
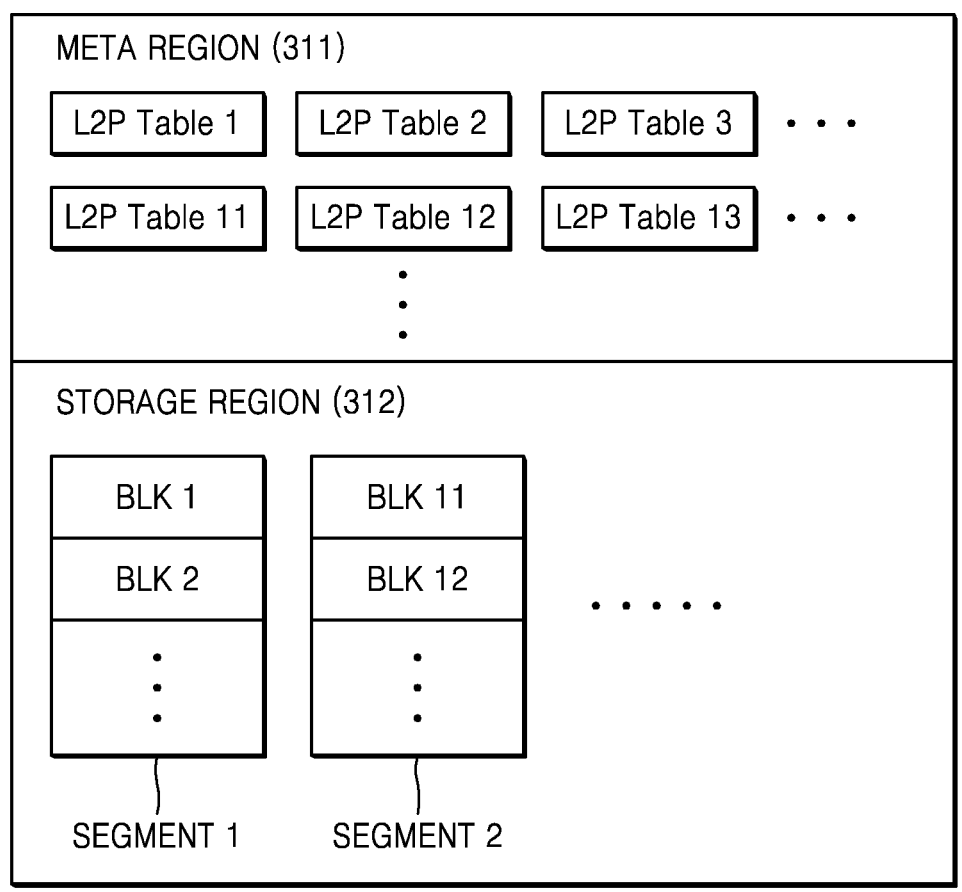
FIG. 5 is a conceptual diagram illustrating one possible structure for the memory cell array of FIG. 3.

FIG. 5 is a conceptual diagram further illustrating in one example 310 of a structure of the memory cell array 121 of FIG. 1 and memory cell array 310 of FIG. 3. Referring to FIG. 5, the memory cell array 310 includes a meta region 311 and a storage region 312.

The meta region 311 may be used to store a plurality of mapping tables (L2P Table) containing mapping information associated with normal data stored in the storage region 312. Here, the storage region 312 may be physically or logically divided in various units. For example, the storage region 312 may include a plurality of segments (SEGMENT), and each segment may include a plurality of blocks (BLK), where each of the blocks is an erasable unit within the memory device.

Each block may include a plurality of pages, and a plurality of memory cells included in each page may be connected to the same word line. The read/write unit of the memory device may correspond in size to that of the page. Alternatively, the read/write unit of the memory device may correspond in size to that of a portion of a page. As an example, the size of each page may be 16 KB, and the read/write unit may be 4 KB. Alternatively, the size of each page and of each read/write unit may be 4 KB. Addresses may be mapped in a 4 KB data unit corresponding to the read/write unit.

Figure 6A:
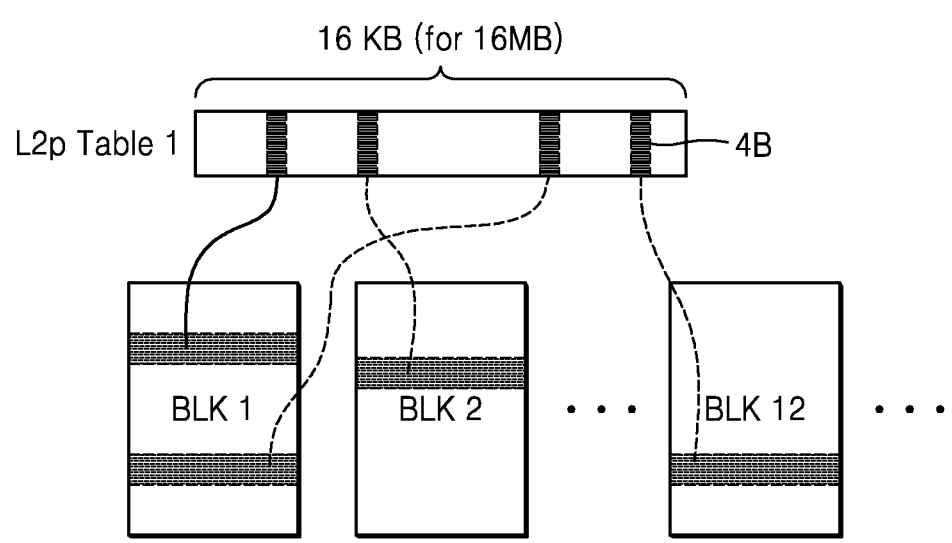

FIGS. 6A and 6B are respective conceptual diagrams illustrating in one example the storing of mapping information in a mapping table.

Referring to FIGS. 5, 6A, and 6B, each mapping table (L2P Table) is assumed to have the same size and to store mapping information for normal data stored in a certain-size region of the storage region 312. As an example, the size of each mapping table may be 16 KB, where the mapping table is used to store mapping information for a 16 MB region of the storage region. The above sizes are merely exemplary, and the size of mapping tables in the memory system as well as the size of a storage region of the storage region 312 corresponding to the mapping table may be variously modified.

When data are randomly written, any one mapping table may store mapping information for data stored in multiple blocks (BLK). For example, random data may be written in 4 KB units within a 16 KB mapping table 4B storing mapping information. Assuming a 16 KB mapping table size, each mapping table may store mapping information associated with about 4000 units of 4 KB normal data. Assuming that the number of blocks included in the storage region 312 is M, each mapping table may store mapping information for about N blocks of data, where 'N' may be less than or equal to 'M'. If the stored data is random data, the value of N may increase.

Referring to a first mapping table (L2P Table 1) illustrated in FIG. 6A, mapping information for data stored in a plurality of blocks is stored in the first mapping table (L2P Table 1). When data are written according to a sequential pattern, the first mapping table (L2P Table 1) may store mapping information of data located in a relatively small number of blocks. On the other hand, when the data are written randomly, the first mapping table (L2P Table 1) may store mapping information for data located in a relatively large number of blocks.

Referring to FIG. 6B, the first mapping table (L2P Table 1) is assumed to include table information for a logical address (ADD_L) and a corresponding physical address (ADD_P). The physical address (ADD_P) may include a block address (A_BLK) and a page address (A_Page). When the read/write unit is smaller than the size of a page, the page address (A_Page) may further include information (e.g., column address) representing the position of data in the page in addition to information indicating the page in the block.

As shown in FIG. 6B, when data are written randomly, the first mapping table (L2P Table 1) may store mapping information for data located in various blocks.

Figure 7:
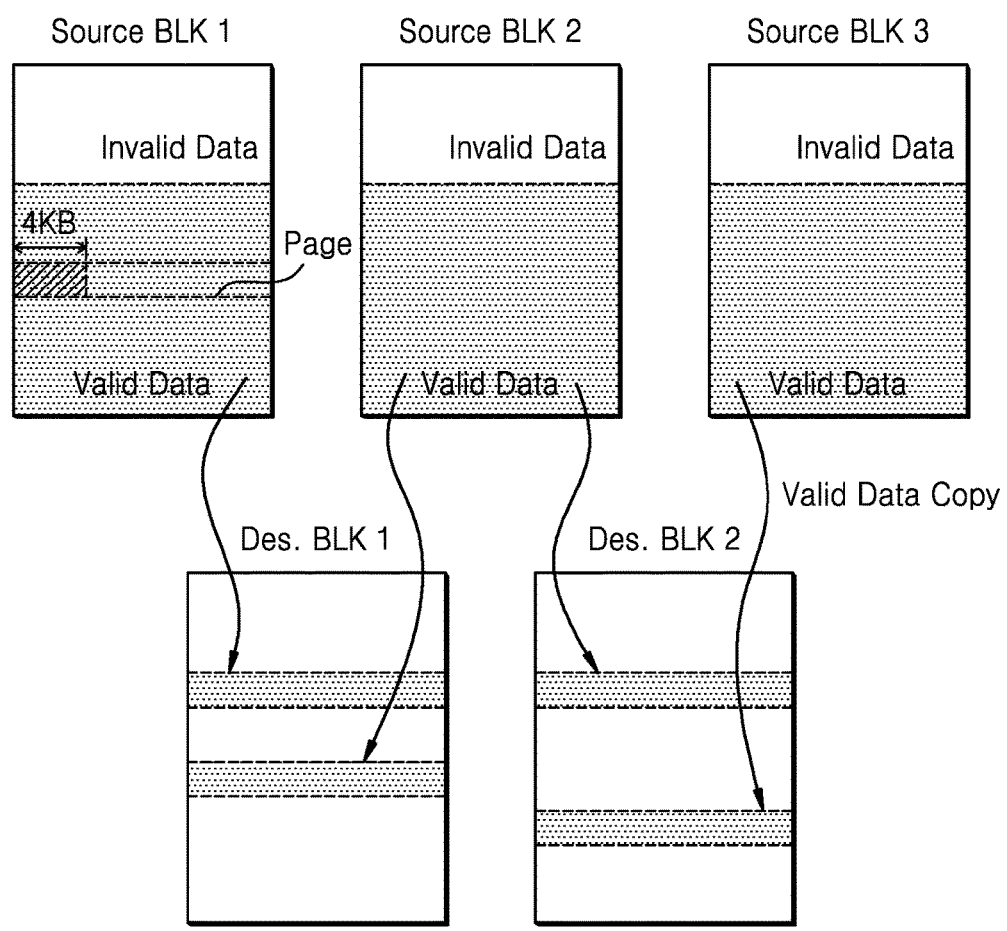
FIGS. 7, 8 and 9 are respective conceptual diagrams illustrating an example of performing a garbage collection operation, an example of updating a mapping table of a memory device by using information stored in an update cache, and an example of performing an update operation on a mapping table a plurality of times in a garbage collection operation according to various embodiments of the inventive concept.

FIG. 7 is a conceptual diagram further illustrating in one example the execution of a simultaneous garbage collection operation according to certain embodiments of the inventive concept.

As illustrated in FIG. 7, a plurality of source blocks are selected and garbage-collected simultaneously in relation to at least one destination block. For example, three source blocks (Source BLK 1, Source BLK 2, and Source BLK 3) are selected, as well as two destination blocks (Des. BLK 1 and Des. BLK 2).

Each of the source blocks currently stores some valid data, but also stores other invalid data. Mapping information related to the valid data may be validly stored, where the valid data is data that may be usefully accessed by the external host. On the other hand, mapping information related to the invalid data may not be validly stored, where the invalid data is data that may not be usefully accessed by the external host.

In the simple example of FIG. 7 valid data is assumed to be collected into a contiguous region of each block. However, particularly where data is randomly written, the stored locations for valid data may be randomly (non-contiguously) distributed over the block.

As conceptually illustrated in FIG. 7, instead of sequentially copying the valid data from one selected source block to a particular destination block, some valid data stored in each one of the three selected source blocks may be copied together into one or more destination block(s). As an example, among the three source blocks, valid data associated with a common mapping table (i.e., mapping information stored in the same mapping table) may be selected together and preferentially copied into the same destination block. Under these conditions within an update cache, the ratio of updated mapping information corresponding to the same mapping table may increase, and thus the locality with respect to the mapping tables may be improved.

Figure 8:
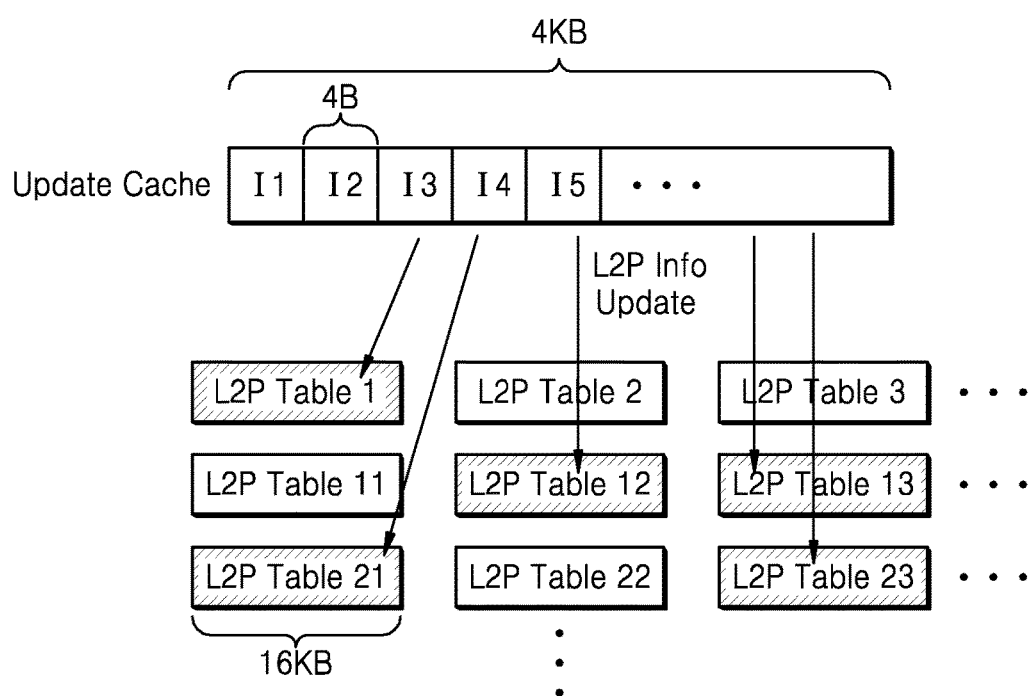

FIG. 8 is another conceptual diagram illustrating in one example the updating of a mapping table for a memory device using updated mapping information stored in an update cache.

Referring to FIG. 8, the update cache is assumed to the 4 KB in size. Mapping information 4B is stored in accordance with a 4 KB write unit. Under these assumptions, the update cache may temporarily store about 1000 mapping information elements (e.g., updated (or changed) mapping information elements I1, I2, I3, . . . ).

Valid data may be copied into a destination block during the garbage collection operation, and updated mapping information will be stored in the update cache accordingly. Subsequently, the mapping table may be updated according to the mapping information stored in the update cache. For example, an update operation for each mapping table may be performed as a 16 KB sized metadata write operation. FIG. 8 illustrate this example wherein the update cache is used to store updated mapping information related to a plurality of mapping tables, and thereafter certain mapping tables are selectively updated using the updated mapping information stored in the update cache.

Figure 9:
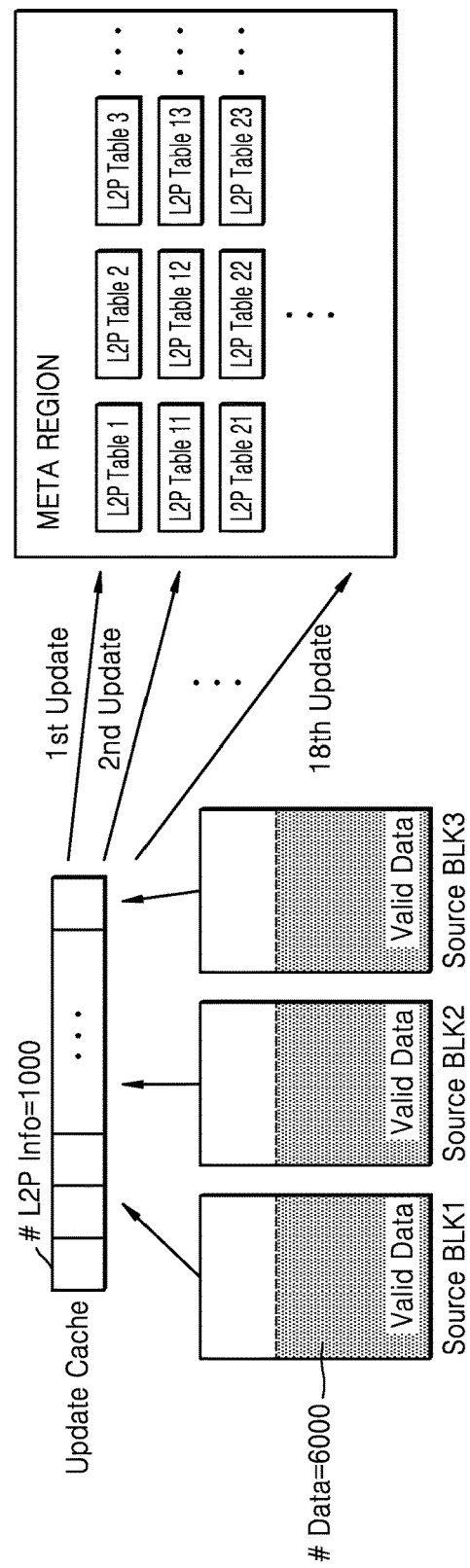

FIG. 9 is still another conceptual diagram illustrating an exemplary, iterative update operation for a mapping table during a garbage collection operation.

Here, it is assumed that multiple source blocks (e.g., Source BLK 1, Source BLK 2 and Source BLK 3) each contains some valid data (e.g., 6 KB of valid data). It is also assumed that a constituent update cache is capable of storing up to 1 KB of data. Under these assumptions, during a conventional garbage collection operation sequentially executed in relation to the multiple source blocks, a total of 18 KB of valid data will be copied to a destination block. Accordingly, mapping information related to the 18 KB of copied data will be updated. In this case, an update operation based on the update cache may be performed as many as 18 times.

Thus, in the foregoing example, each 1 KB of valid data presented in a source block must be copied and corresponding mapping information update through the update cache. This approach inherently reduces the possibility of "update data" contained in the updated mapping information will be related to the same mapping table. In other words, the foregoing approach tends to increase the number of mapping tables that need to be updated as the result of the garbage collection operation. As a result, many different mapping tables are updated during the update operation, and the latency period required for execution of the update operation increases.

It may further be appreciated from the foregoing example that the same mapping table may be frequently updated in the process of performing the update operation—as many as 18 times. Such a high frequency of repeated write/erase operations to the memory cells storing the same mapping table will reduce the useful lifetime of the memory device.

However, in contrast to the foregoing example, certain embodiments of the inventive concept select a plurality of source blocks and simultaneously perform a garbage collection operation on the collective valid data of the selected source blocks. Using this inventive approach, the probability of valid data from the plurality of source blocks being related to the same mapping table (L2P Table) is much higher than in the conventional approach. That is, the expanded pool of valid data is more likely to be related to the same mapping table (L2P Table), and thus the mapping information corresponding to a relatively smaller number of mapping tables may be stored in the update cache. And as a result, during a subsequent update operation for any given mapping table, it is likely that the mapping table will require fewer update cycles, thereby avoiding undue memory cell wear.

Figure 10:
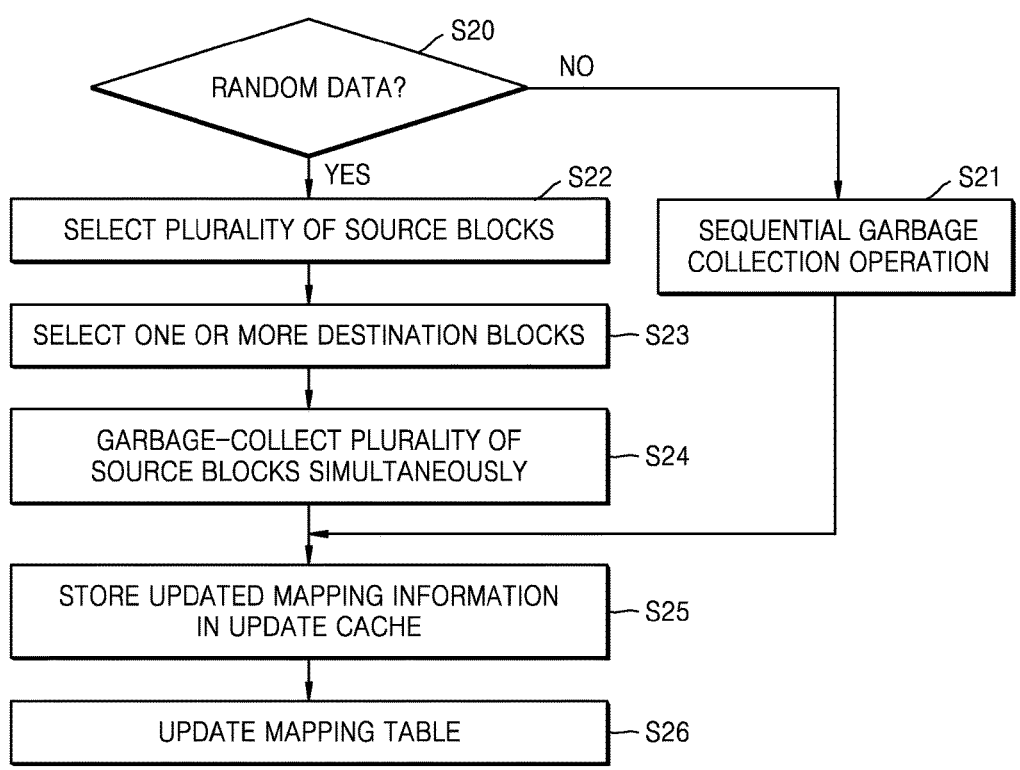
FIGS. 10, 11 and 12 are respective flowcharts summarizing various memory controller operations for embodiments of the inventive concept.
Figure 11:
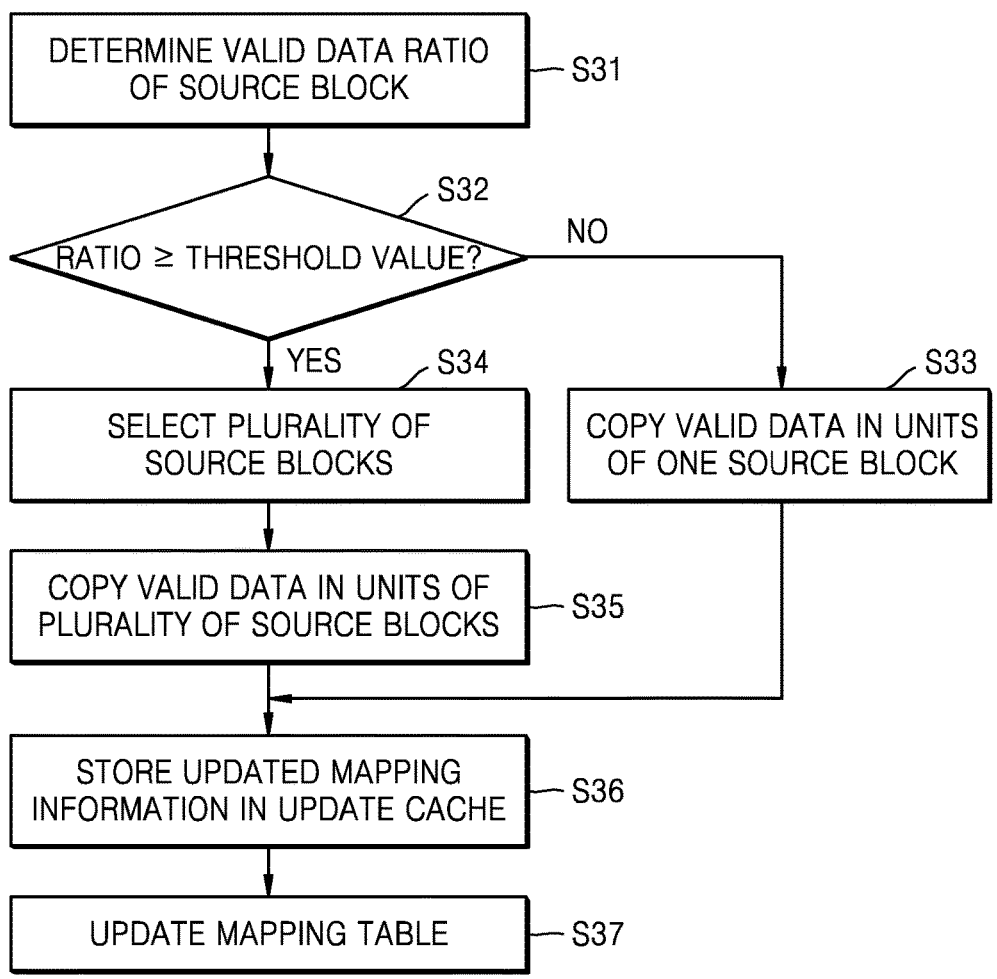
Figure 12:
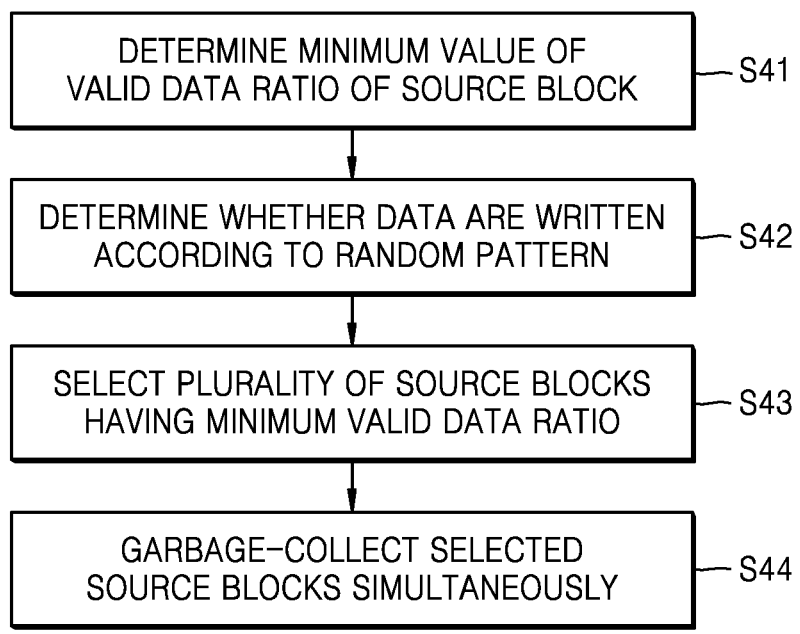

FIGS. 10, 11 and 12 are respective flowcharts illustrating various, exemplary operations performed by a memory controller in a memory system according to embodiments of the inventive concept.

Referring to FIG. 10, a threshold determination may be made as to whether or not a simultaneous garbage collection operation should be performed. For example, a determination may be made regarding data type (e.g., random verses patterned) for one or more blocks being selected (or potentially being) selected for garbage collection. Thus, the threshold determination of the type of garbage collection operation to be executed (e.g., block-sequential verse block-simultaneous) may be made by considering data type. Where the data type is random or largely random (S20=Yes), the memory controller may determine to perform a simultaneous garbage collection operation according to an embodiment of the inventive concept. Else, if the data is determined to be patterned data (S20=No), the memory controller may determine to perform a sequential garbage collection operation (S21).

The sequential garbage collection operation may be performed substantially along conventional lines, but will ultimately result in the storing of corresponding updated mapping information in the update cache (S25) and the update of at least one mapping table in non-volatile memory (S26).

The simultaneous garbage collection operation may be performed as described above. That is, a plurality of source blocks (i.e., at least two) is selected (S22), if not already selected during the data type determination step (S20), and at least one destination block is also selected (S23). Following these selections, the simultaneous garbage collection operation is performed for the plurality of source blocks (24). Again this results in the storing of corresponding updated mapping information in the update cache (S25) and the update of at least one mapping table in non-volatile memory (S26).

The determination of whether to perform a sequential garbage collection operation or a simultaneous garbage collection operation may be made using one or more different considerations. In one example, the memory system may be pre-set to randomly write data in response to write request(s) received from the host. In another example, randomly written data will exhibit a relatively high ratio of valid data to total written data for selected source block(s).

FIG. 11 illustrates this second alternative to the determination of a garbage collection operation type. Here, instead of considering stored data type (S20 in FIG. 10), a valid data ratio for data stored in selected block(s) is determined (S31). Where the determined valid data ratio is greater than an established threshold value (S32=Yes), a simultaneous garbage collection operation is performed. However, where the determined ratio is not greater than the established threshold value (S32=No), a sequential garbage collection operation is performed.

Here, the sequential garbage collection operation includes the step of copying valid data in units of one (1) source block (S33). Ultimately, this sequential garbage collection operation results in updated mapping information that is written to an update cache (S36). Subsequently, the updated mapping information stored in the update cache is used to update a mapping table stored in non-volatile memory (S37). In contrast, the simultaneous garbage collection operation includes the steps of selecting a plurality of source blocks (S34), if not already selected during the valid data ratio determining step (S31), and copying valid data in units of more than one source block (S35). Ultimately, this simultaneous garbage collection operation results in updated mapping information that is written to an update cache (S36). Subsequently, the updated mapping information stored in the update cache is used to update a mapping table stored in non-volatile memory (S37).

Referring to FIG. 12, an example is illustrated wherein multiple considerations or factors are used to determine whether a sequential garbage collection operation or a simultaneous garbage collection operation should be performed. For example, a first determination is made regarding a minimum value of valid data ratio for data stored in at least one selected source block (S41). After comparing the ratio of valid data with a threshold value, it may further be determined whether data are randomly written (S42). These two determinations may be made independently or conditionally for each one of a number of source blocks. Thereafter, certain ones of the considered source blocks that are determined to store substantially random data and/or meet an established threshold for valid data ratio may be selected for simultaneous garbage collection (S43), and thereafter a simultaneous garbage collection operation may be performed (S44) Although not illustrated in FIG. 12, it is understood that other possible source blocks considered in steps (S41) and (S42) may be designated for sequential garbage collection (i.e., source blocks determined to store substantially patterned data and/or failing to meet the established threshold for valid data ratio.

Figure 13:
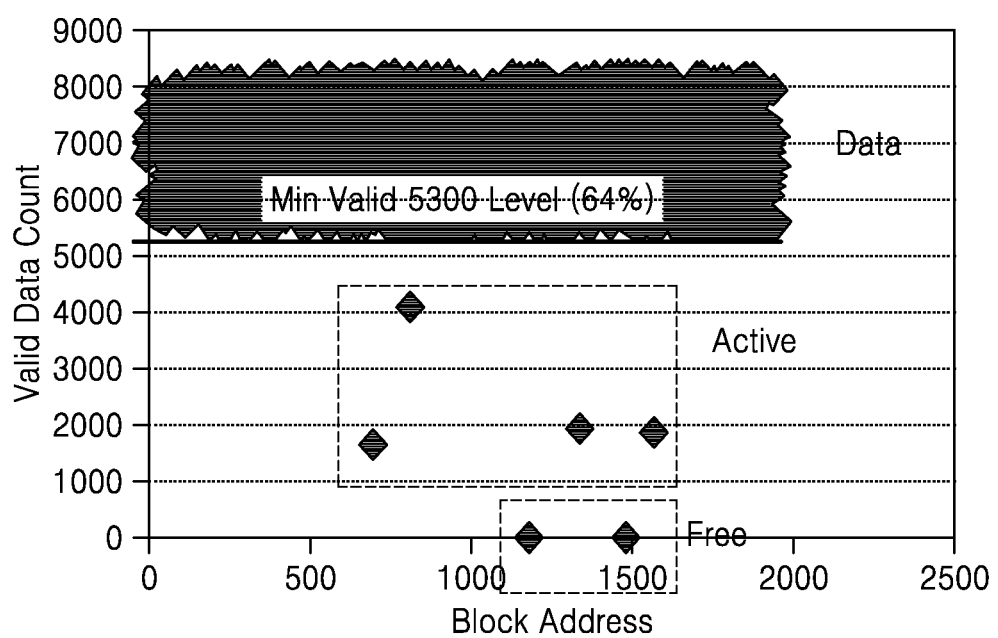
FIG. 13 is a graph illustrating an example of the number (count) of valid data included in a block when data are written according to a random pattern.

FIG. 13 is a graph illustrating an example of valid data count for data stored in a selected block when data are randomly written.

When random data are written to a plurality of blocks included in a memory device, the distribution of the valid data count for each block may appear as illustrated in FIG. 13. Here, a ratio of valid data for each block may be calculated according to the valid data count of in FIG. 13.

Block(s) having no (0) valid data count are free block(s). Block(s) having a valid data count less than an established threshold (i.e., having a relatively low valid data count) are active block that is be additionally written to. However, as has been described above, the continuous writing and re-writing of data stored in a block increasingly results in the accumulation of invalid data in the block. Hence, a rising count of invalid data reduces the valid data ratio for the block until it falls below a given valid data ratio threshold.

In the illustrated example of FIG. 13, the exemplary source block has random data written thereto and has a relatively low valid data ratio corresponds to about 53 KB which indicates a valid data ratio for the block of about 64%. A memory system designed may establish multiple threshold by which a determination is made as to whether a sequential garbage collection operation or a simultaneous garbage collection operation should be performed. Further, these multiple thresholds may be used to "select" one or more source blocks in relation to a sequential garbage collection operation or a simultaneous garbage collection operation to be performed.

Figure 14A:
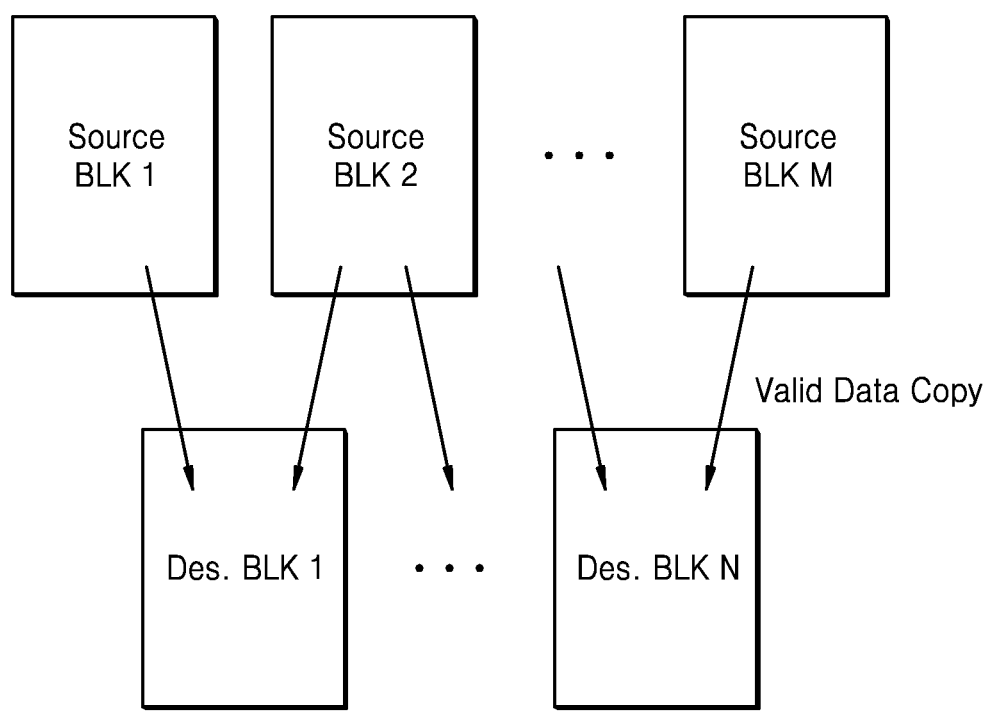
FIGS. 14A and 14B are block diagrams illustrating an example of selecting source blocks and destination blocks and an example of mapping information stored in an update cache.
Figure 14B:
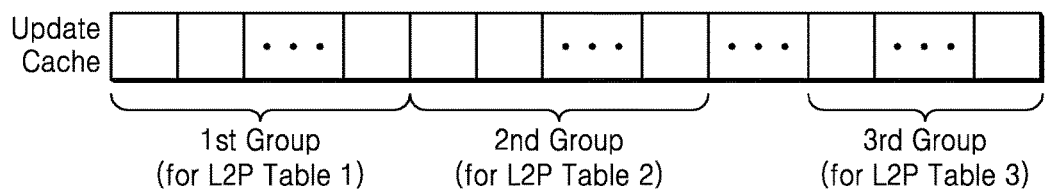

FIGS. 14A and 14B are respective conceptual diagrams illustrating an example of selecting source blocks and destination blocks and an example of mapping information stored in an update cache.

FIG. 14A illustrates an example in which, for a simultaneous garbage collection operation, a plurality of (e.g., M) source blocks are selected and a plurality of (e.g., N) destination blocks are selected. The number of source blocks (Source BLK 1 to Source BLK M) may be larger than the number of destination blocks (Des. BLK 1 to Des. BLK N). The valid data of each of the source blocks (Source BLK 1 to Source BLK M) may be copied into the destination blocks (Des. BLK 1 to Des. BLK N).

As the more source blocks (Source BLK 1 to Source BLK M) are selected, the mapping information stored in the update cache may have the higher locality with respect to the mapping table. On the other hand, as the more source blocks (Source BLK 1 to Source BLK M) are selected, the processing throughput requiring management, such as the selection of correlated valid data across the plurality of source blocks, increases. According to an certain embodiments of the inventive concept, appropriate limit(s) may be set for the selection of source blocks (Source BLK 1 to Source BLK M) in view of memory system resources.

As illustrated in FIG. 14B, among the source blocks (Source BLK 1 to Source BLK M), valid data related to the same mapping table may be defined as the valid data of the same group. For example, the valid data with the mapping information associated with a first mapping table (L2P Table 1) may be stored distributively (or in a distributed manner) in the source blocks (Source BLK 1 to Source BLK M), and valid data corresponding thereto may be defined as valid data of a first group. Valid data of a plurality of groups may be stored in the source blocks (Source BLK 1 to Source BLK M).

With the foregoing in mind, a valid data copy operation may be performed in group units, and the mapping information thereof may be stored in the update cache based on the copy operation performed in group units. Accordingly, the mapping information associated with valid data belonging to the same group may be stored in the update cache, and thus the mapping information stored in the update cache may have a high locality.

Figure 15:
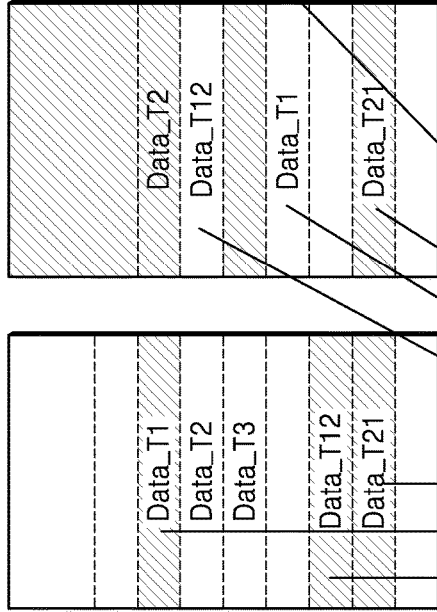
FIG. 15 is a block diagram illustrating an example of updating a mapping table according to an embodiment.
Figure 15:
Figure 15:
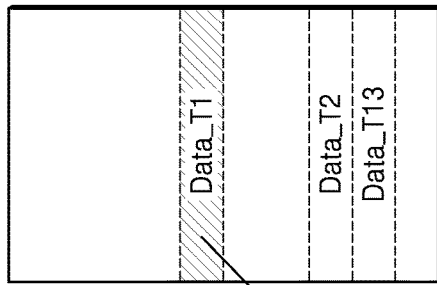
Figure 15:
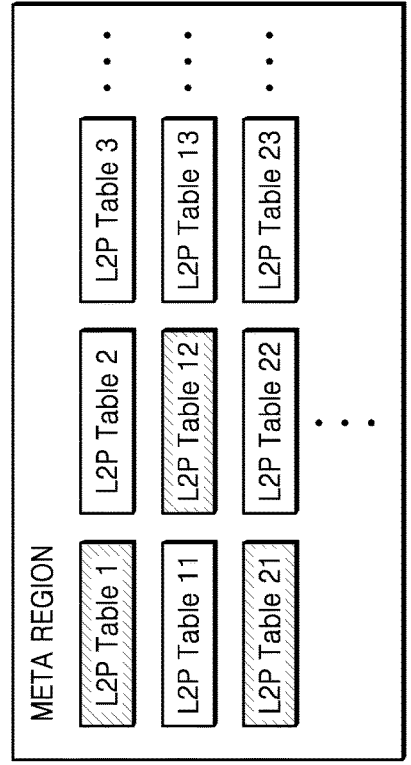
Figure 15:

FIG. 15 is a conceptual diagram illustrating an example of updating a mapping table according to an embodiment of the inventive concept. FIG. 15 illustrates an example in which three source blocks (Source BLK 1 to Source BLK 3) are selected together.

Each of the source blocks (Source BLK 1 to Source BLK M) may include a plurality of valid data related to a plurality of mapping tables. As an example, the first source block (Source BLK 1) may store valid data (Data_T1, Data_T2, Data_T3, Data_T12, Data_T21, . . . ) related to various mapping tables.

Valid data belonging to the same group may be selected from the source blocks (Source BLK 1 to Source BLK M) and copied into the destination block, and the changed mapping information may be stored in the update cache according to the copy result. For example, valid data (Data_T1) of the first group may be selected from the source blocks (Source BLK 1 to Source BLK M), and the changed mapping information may be stored in some region of the update cache in relation to valid data (Data_T1) of the first group. Similarly, valid data (Data_T12 and Data_21) of the 12th and 21st groups may be selected therefrom, and the changed mapping information may be stored in some other region of the update cache in relation thereto.

The amount of mapping information corresponding to the same mapping table in the update cache may be increased, and thus the number of mapping tables updated in each update process may be minimized. For example, when the mapping information stored in the update cache includes only the information related to the first, 12th, and 21st mapping tables (L2P Table 1, 12, and 21), only the first, 12th, and 21st mapping tables (L2P Table 1, 12, and 21) among a plurality of mapping tables may be updated in the update process.

Figure 16:
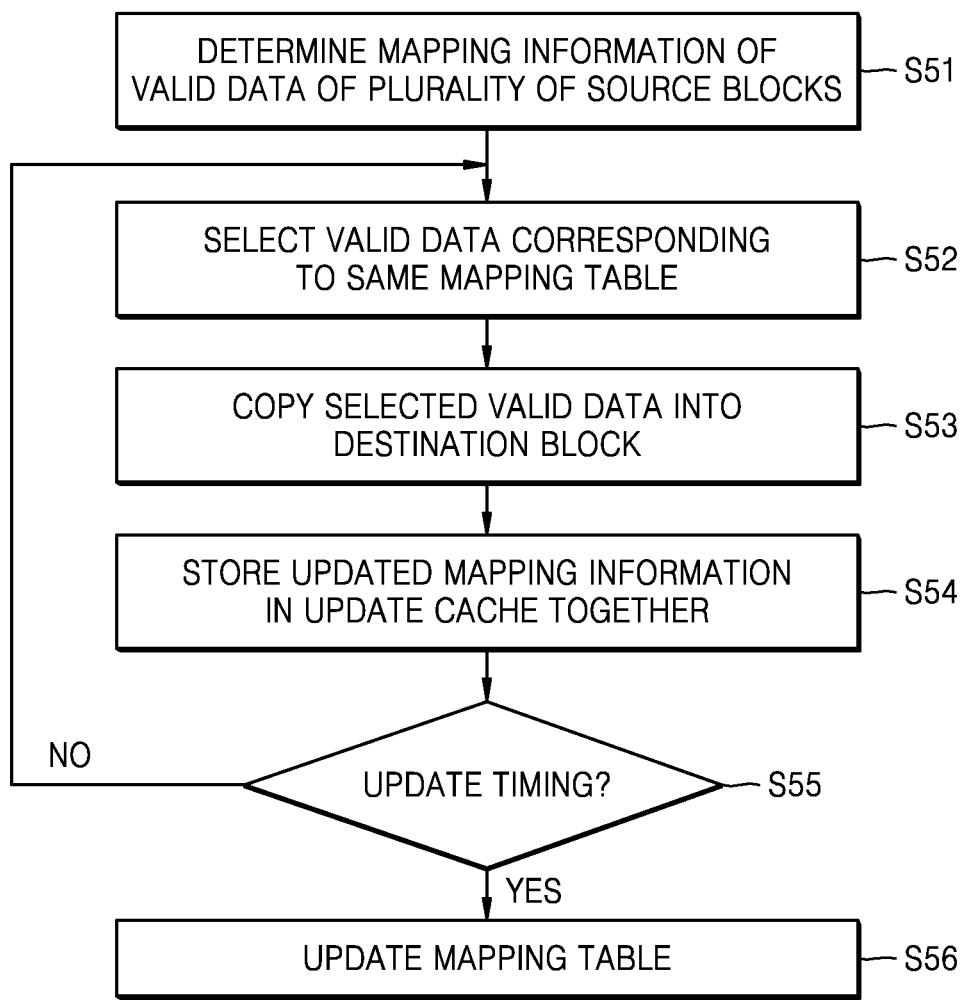
FIG. 16 is a flowchart summarizing a memory controller operation according to an embodiment of the inventive concept.

FIG. 16 is a flowchart illustrating an operation of a memory controller according to an embodiment of the inventive concept. FIG. 16 illustrates an example of selecting valid data, as well as corresponding mapping information which is to be stored together in the update cache, from a plurality of source blocks.

Referring to FIG. 16, a plurality of source blocks may be selected for garbage collection, and the selection operation may be performed by determining the ratio of valid data in a source block according to the above embodiment. The mapping information may be stored as metadata in the memory system, and thus the mapping information of valid data of the plurality of source blocks may be determined (S51).

According to the determination result, the position of the mapping table related to the valid data stored in each of the plurality of source blocks may be determined. According to the determination result, the valid data, the mapping information of which is to be stored together in the update cache, may be selected from a plurality of source blocks. For example, the valid data related to the same mapping table (or the valid data with the mapping information stored in the same mapping table) may be selected (S52).

The selected valid data may be copied into one or more destination blocks (S53), and the mapping information about the selected valid data may be stored together in the update cache (S54). By repetition of the above operation, the mapping information corresponding to a relatively small number of mapping tables may be stored in the update cache. From another viewpoint, a large number of mapping information elements corresponding to any one mapping table may be stored together in the update cache.

Thereafter, it may be determined whether the update timing is reached (S55). When the update timing is not reached, the above process of selecting the valid data and the above process of storing the changed mapping information in the update cache may be repeated. Thereafter, when the update timing is reached, the mapping information stored in the update cache may be updated in one or more mapping tables (S56).

Figure 17:
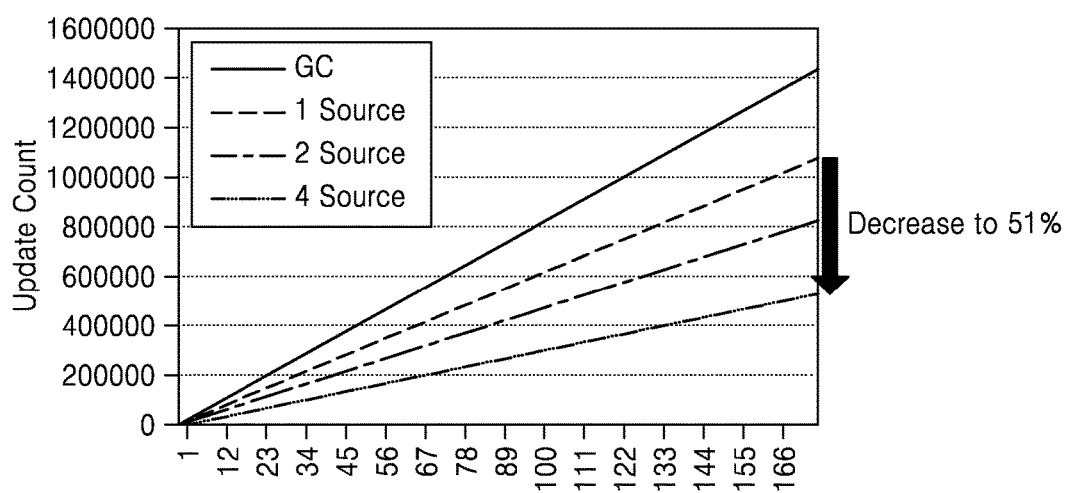
FIG. 17 is a graph illustrating an example of the frequency (count) of an update operation depending on the number of selected source blocks.

FIG. 17 is a graph illustrating an example of the frequency (count) of an update operation depending on a number of selected source blocks.

As illustrated in FIG. 17, as the number of source blocks selected for garbage collection increases, the update count about the mapping table may decreases. As an example, when one source block is selected, as many mapping tables as about 74% of the number of mapping information elements stored in the update cache may be updated. However, according to an embodiment, when four source blocks are selected, only as many mapping tables as about 38% of the number of mapping information elements stored in the update cache may be updated. This may indicate that the update count is reduced to about 51%.

Figure 18:
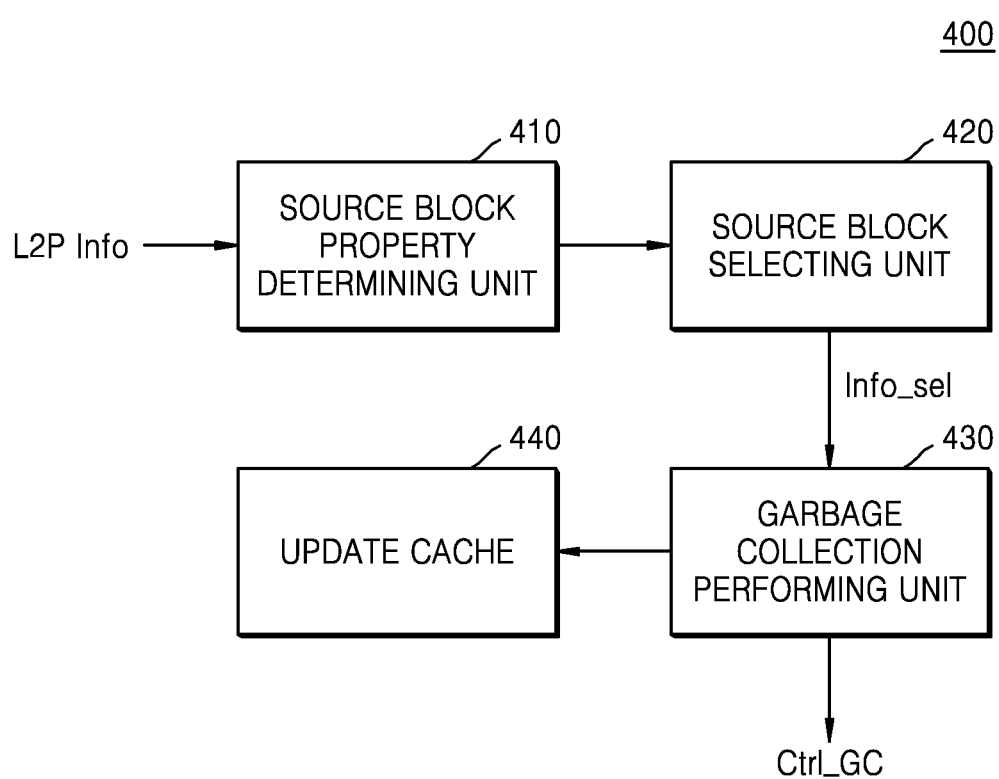
FIG. 18 is a block diagram illustrating a configuration of a memory controller according to an embodiment of the inventive concept.

FIG. 18 is a block diagram illustrating a configuration of a memory controller according to an embodiment of the inventive concept.

As illustrated in FIG. 18, a memory controller 400 may include a source block property determining unit 410, a source block selecting unit 420, a garbage collection performing unit 430, and an update cache 440. The update cache 440 may include a volatile memory such as a SRAM or a DRAM. Also, the source block property determining unit 410, the source block selecting unit 420, and the garbage collection performing unit 430 may be implemented as hardware or software. As an example, the functions of the source block property determining unit 410, the source block selecting unit 420, and the garbage collection performing unit 430 may be implemented as software by the firmware of the above FTL.

By reference to the mapping information (L2P Info), the source block property determining unit 410 may determine the property of valid data included in each source block. For example, the position of the mapping table storing the mapping information about each of the valid data included in the source block may be determined. Also, the valid data related to the same group (or with the mapping information managed by the same mapping table) may be stored concentratively (or in a concentrated manner) in some source blocks, and the source block property determining unit 410 may determine the relationship between the source blocks by reference to the mapping information (L2P Info) about the valid data of a plurality of source blocks.

With reference to the above determination result, the source block selecting unit 420 may select source blocks to be garbage-collected simultaneously. The source blocks capable of improving the locality thereof may be selected according to the above determination result. For example, when the storage ratio of valid data related to a particular mapping table is high in any one source block and the storage ratio of valid data related to the same mapping table is also high in another source block, the source blocks may be selected as source blocks to be garbage-collected simultaneously. That is, according to the present embodiment, the source blocks may be selected in consideration of the storage properties of the valid data.

According to the above selection result (Info_sel), the garbage collection performing unit 430 may generate a garbage collection control signal (Ctrl_GC) to perform an operation of copying the valid data from the selected source blocks, an operation of storing the mapping information in the update cache, and an operation of updating the mapping table by using the update cache, as in the above embodiment.

Figure 19:
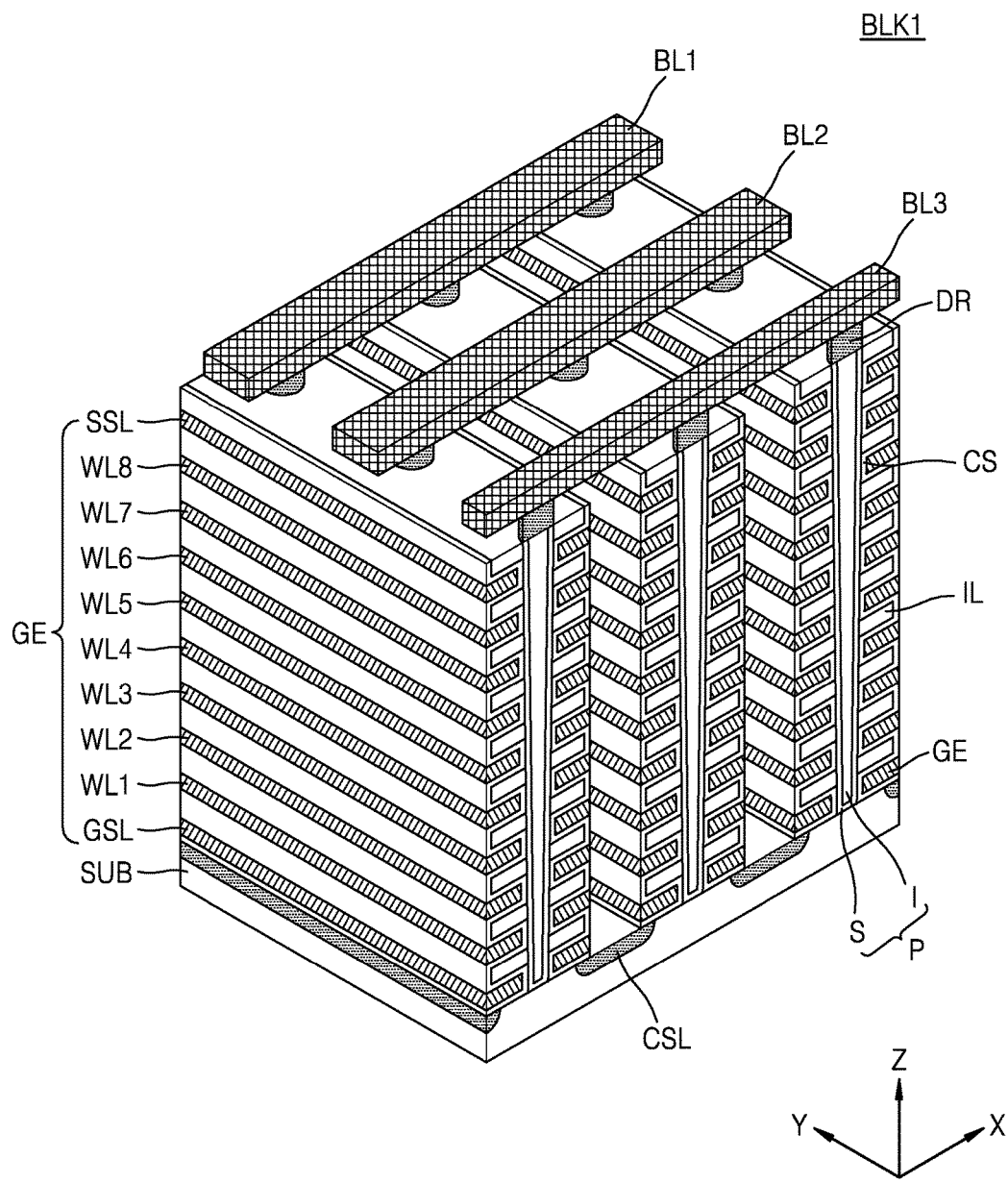
FIG. 19 is a perspective diagram illustrating one possible implementation variation for the memory cell array of a memory device.

FIG. 19 is a perspective diagram illustrating a memory cell array for a memory device that may be incorporated within certain embodiments of the inventive concept.

The memory cell array may include a plurality of blocks, and each block may have a three-dimensional (3D) structure (or a vertical structure). For example, each block may include structures extending in first to third directions. For example, in the case of a flash memory device, each cell block may include a plurality of NAND strings extending in the third direction. In this case, a plurality of NAND strings may be spaced apart from each other by a certain distance in the first and second directions. FIG. 19 may represent a schematic diagram corresponding to one block BLK1. Also, the block BLK1 may be a block included in a meta region or may be a block included in a storage region.

Referring to FIG. 19, the cell block BLK1 may be formed in a perpendicular direction with respect to a substrate SUB. Although FIG. 19 illustrates that the cell block BLK1 includes two selection lines GSL and SSL, eight word lines WL1 to WL8, and three bit lines BL1 to BL3, the numbers of the lines may be variously modified.

The substrate SUB may have a first conductivity type (e.g., p-type), and a common source line CSL extending in the first direction (e.g., Y-direction) and doped with a dopant of a second conductivity type (e.g., n-type) may be provided on the substrate SUB. On a region of the substrate SUB between two adjacent common source lines CSL, a plurality of insulating layers IL extending in the first direction may be provided sequentially in the third direction (e.g., Z-direction). The insulating layers IL may be spaced apart from each other by a certain distance in the third direction. For example, the insulating layers IL may include an insulating material such as a silicon oxide.

On a region of the substrate SUB between two adjacent common source lines CSL, a plurality of pillars P may be provided to be disposed sequentially in the first direction and penetrate the insulating layers IL in the third direction. For example, the pillars P may penetrate the insulating layers IL to contact the substrate SUB. For example, a surface layer S of each pillar P may include a silicon material with a first type and may function as a channel region. An inner layer I of each pillar P may include an insulating material such as a silicon oxide, or an air gap.

In a region between two adjacent common source lines CSL, a charge storage layer CS may be provided along the exposed surfaces of the insulating layers IL, the pillars P, and the substrate SUB. The charge storage layer CS may include a gate insulating layer (or a tunneling insulating layer), a charge trapping layer, and a blocking insulting layer. For example, the charge storage layer CS may have an oxide-nitride-oxide (ONO) structure. Also, in a region between two adjacent common source lines CSL, on the exposed surface of the charge storage layer CS, a gate electrode GE including the selection lines GSL and SSL and the word lines WL1 to WL8 may be provided.

Drains or drain contacts DR may be provided respectively on the pillars P. For example, the drains or drain contacts DR may include a silicon material doped with a dopant of a second conductivity type. On the drains DR, the bit lines BL1 to BL3 may be provided to extend in the second direction (e.g., X-direction) and be spaced apart from each other by a certain distance in the first direction.

U.S. Pat. Nos. 7,679,133, 8,553,466, 8,654,587, 8,559,235, and U.S. Patent Application No. 2011/0233648 describe various configurations of a 3D memory array in which a 3D memory array includes a plurality of levels and word lines and/or bit lines are shared between the levels, the disclosures of which are incorporated herein by reference.

Figure 20:
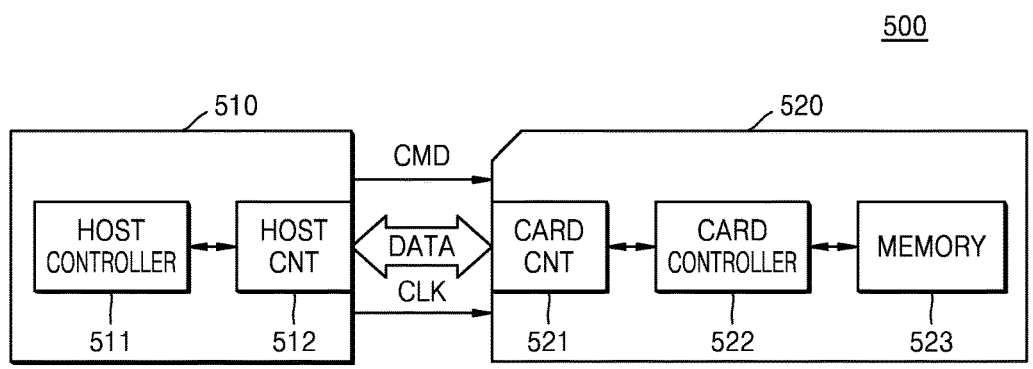
FIG. 20 is a block diagram illustrating an example of applying a memory system to a memory card system according to an embodiment of the inventive concept.

FIG. 20 is a block diagram illustrating an example of applying a memory system to a memory card system according to an embodiment of the inventive concept. As an example, it is assumed that the memory system is a flash memory system.

Referring to FIG. 20, a memory card system 500 may include a host 510 and a memory card 520. The host 510 may include a host controller 511 and a host connector 512. The memory card 520 may include a card connector 521, a card controller 522, and a memory system 523. The memory system 523 may be implemented by using the embodiments illustrated in FIGS. 1 to 19. Accordingly, the memory system 523 may perform a garbage collection operation according to the above embodiment and may reduce the update frequency of a mapping table by selecting a plurality of source blocks and performing a garbage collection operation simultaneously thereon.

The host 510 may write/read data into/from the memory card 520. The host controller 511 may transmit a command (CMD), data (DATA), and a clock signal (CLK), which is generated by a clock generator (not illustrated) in the host 510, through the host connector 512 to the memory card 520.

In response to a request received through the card connector 521, the card controller 522 may provide data to the memory system 523 in synchronization with a clock signal generated by a clock generator (not illustrated) in the card controller 522. The memory system 523 may store the data received from the host 510.

The memory card 520 may be implemented to include, for example, a compact flash card (CFC), a microdrive, a smart media card (SMC), a multimedia card (MMC), a security digital card (SDC), a universal flash storage (UFS), a memory stick, and a USB flash memory driver.

Figure 21:
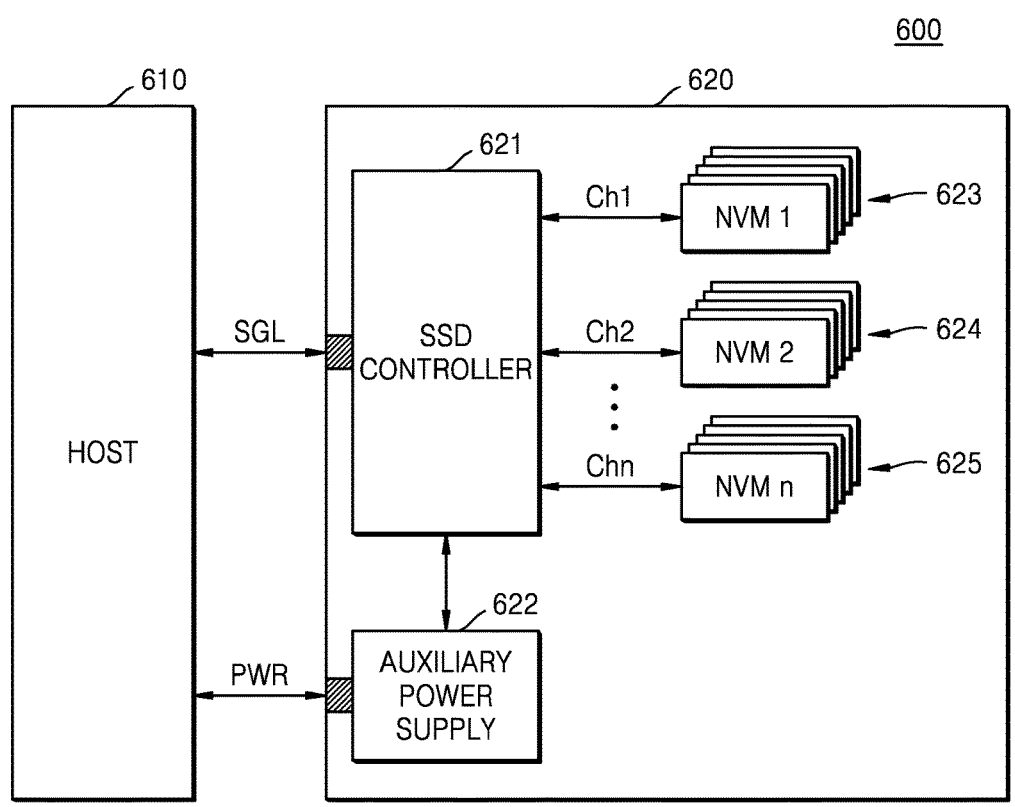
FIG. 21 is a block diagram illustrating an example of applying a memory device to a solid state drive (SSD) system according to embodiments of the inventive concept.

FIG. 21 is a block diagram illustrating an example of applying a memory device to a SSD system according to embodiments of the inventive concept.

Referring to FIG. 21, a SSD system 600 may include a host 610 and a SSD 620. The SSD 620 may exchange signals with the host 610 through a signal connector and receive an input of power through a power connector. The SSD 620 may include a SSD controller 621, an auxiliary power supply 622, and a plurality of non-volatile memory systems 623, 624, and 625. Each of the non-volatile memory systems 623, 624, and 625 may include memory devices according to embodiments. According to an embodiment, each of the non-volatile memory systems 623, 624, and 625 may perform a garbage collection operation according to the above embodiment and may reduce the update frequency of a mapping table by selecting a plurality of source blocks and performing a garbage collection operation simultaneously thereon.

The foregoing is illustrative of embodiments of the inventive concept and is not to be construed as limiting the inventive concept. Also, those of ordinary skill in the art will readily appreciate that various modifications are possible in the embodiments without materially departing from the scope of the inventive concept.

While the inventive concept has been particularly shown and described with reference to embodiments thereof, it will be understood that various changes in form and details may be made therein without departing from the scope of the following claims.

What is claimed is:

1. A method of performing a garbage collection operation in a memory system including a memory controller that includes an update cache and a non-volatile memory device that includes a memory cell array having a storage region divided into blocks and a meta region storing mapping tables for managing data stored in the storage region, the method comprising:
   storing mapping information in the update cache;
   determining, by the memory controller, whether to perform a sequential garbage collection operation or a simultaneous garbage collection operation for at least one of the blocks;
   upon determining to perform the sequential garbage collection operation, collecting valid data from one source block among the blocks, and updating the mapping information stored in the update cache in response to collecting the valid data from the one source block, else
   upon determining to perform the simultaneous garbage collection operation, simultaneously collecting valid data from a plurality of source blocks among the blocks, and updating the mapping information stored in the update cache in response to collecting the valid data from the plurality of source blocks.

2. The method of claim 1, wherein the determining of whether to perform a sequential garbage collection operation or simultaneous garbage collection operation for the at least one of the blocks comprises determining, for at least one of the blocks, whether data stored in the at least one of the blocks is random data, and if the data stored in the at least one of the blocks is random data, determining to perform the simultaneous garbage collection operation, else determining to perform the sequential garbage collection operation.

3. The method of claim 1, wherein the determining of whether to perform a sequential garbage collection operation or simultaneous garbage collection operation for the at least one of the blocks comprises:
   determining a valid data ratio for data stored in at least one of the blocks;
   comparing the determined valid data ratio to a valid data ratio threshold; and
   upon determining that the determined valid data ratio is greater than or equal to the valid data ratio threshold, determining to perform the simultaneous garbage collection operation, else determining to perform the sequential garbage collection operation.

4. The method of claim 1, wherein the determining of whether to perform a sequential garbage collection operation or simultaneous garbage collection operation for the at least one of the blocks comprises:

(a) determining for at least one of the blocks whether data stored in the at least one of the blocks is random data; and
(b) determining a valid data ratio for data stored in at least one of the blocks and comparing the determined valid data ratio to a valid data ratio threshold,
such that the determining of whether to perform the simultaneous garbage collection operation or the sequential garbage collection operation is made in response to at least one of (a) and (b).

5. The method of claim 1, further comprising:
after updating the mapping information stored in the update cache in response to the collecting of valid data from the one source block, updating at least one of the mapping tables stored in the meta region of the memory cell array using the updated mapping information stored in the update cache.

6. The method of claim 1, further comprising:
after updating the mapping information stored in the update cache in response to the collecting of valid data from the plurality of source blocks, updating at least one of the mapping tables stored in the meta region of the memory cell array using the updated mapping information stored in the update cache.

7. The method of claim 1, further comprising:
upon determining to perform the simultaneous garbage collection operation, selecting at least two of the blocks as selected source blocks and selecting at least one of the blocks as a destination block,
wherein the simultaneously collecting the valid data from the plurality of source blocks comprises simultaneously copying valid data from the source blocks to the destination block.

8. The method of claim 7, wherein the mapping tables stored in the meta region of the memory cell array include a first mapping table and a second mapping table, the selected source blocks include a first source block and a second source block, and the simultaneous copying of valid data from the selected source blocks comprises:
identifying first valid data stored in the first source block and associated with the first mapping table;
identifying second valid data stored in the second source block and associated with the first mapping table; and
simultaneously copying the first valid data from the first source block and second valid data from the second source block.

9. The method of claim 8, further comprising:
updating the mapping information stored in the update cache associated with the first mapping table in response to the simultaneously copying of the first valid data from the first source block and the second valid data from the second source block; and
updating the first mapping table in the meta region of the memory cell array using the updated mapping information stored in the update cache.

10. The method of claim 9, wherein the updating of the first mapping table in the meta region of the memory cell array is performed in response to an update timing schedule.

11. A memory controller that controls operation of a memory device that includes a memory cell array having a meta region storing mapping tables and a storage region divided into blocks, the memory controller comprising:
a source block property determining unit that references mapping information to determine a property of valid data stored in the blocks and generate a determination result;
a source selecting block unit that, responsive to the determination result, identifies at least two selected source blocks suitable for use during a simultaneous garbage collection operation and generates a selection result;
a garbage collection performing unit that, responsive to the selection result, controls execution of the simultaneous garbage collection operation by garbage collecting simultaneously from the selected source blocks; and
an update cache that stores initial mapping information received from the memory device and updates the initial mapping information in response to the execution of the simultaneous garbage collection operation to generate and store updated mapping information.

12. The memory controller of claim 11, wherein the update cache is a volatile memory.

13. The memory controller of claim 11, wherein the memory device is a solid-state drive (SSD).

14. The memory controller of claim 13, wherein the memory cell array is a three-dimensional flash memory cell array.

15. The memory controller of claim 11, wherein the source block property determining unit, source block selecting unit, and garbage collection performing unit are implemented as at least one of software stored in a non-volatile memory and firmware implementing at least in part a flash translation layer.

16. The memory controller of claim 11, wherein the property of valid data determined by the source block property determining unit includes at least one of; randomness of storage for the valid data, relationship of the valid data to at least one of the mapping tables, and storage location of the valid data in the storage region.

* * * * *